United States Patent
Ludewig

(10) Patent No.: US 10,569,942 B2
(45) Date of Patent: Feb. 25, 2020

(54) MEASURED VOLUME DISPENSING CLOSURE, CLOSURE HAVING OVERLAPPING COVER MEMBERS, AND METHODS

(71) Applicant: Jason W. Ludewig, Rockford, IL (US)

(72) Inventor: Jason W. Ludewig, Rockford, IL (US)

(73) Assignee: J.L. Clark, Inc., Rockford, IL (US)

( * ) Notice: Subject to any disclaimer, the term of this patent is extended or adjusted under 35 U.S.C. 154(b) by 0 days.

(21) Appl. No.: 16/152,069

(22) Filed: Oct. 4, 2018

(65) Prior Publication Data

US 2019/0106253 A1    Apr. 11, 2019

Related U.S. Application Data

(60) Provisional application No. 62/569,114, filed on Oct. 6, 2017, provisional application No. 62/652,412, filed on Apr. 4, 2018.

(51) Int. Cl.
| | |
|---|---|
| *B65D 51/18* | (2006.01) |
| *B65D 47/08* | (2006.01) |
| *B65D 83/06* | (2006.01) |
| *G01F 11/26* | (2006.01) |

(52) U.S. Cl.
CPC ........ *B65D 51/18* (2013.01); *B65D 47/0833* (2013.01); *B65D 83/06* (2013.01); *G01F 11/26* (2013.01); *G01F 11/261* (2013.01); *B65D 2251/0018* (2013.01); *B65D 2251/0087* (2013.01)

(58) Field of Classification Search
CPC .... B65D 51/18; B65D 47/0833; B65D 83/06; B65D 2251/0018; B65D 2251/0087; B65D 47/08; A47G 19/24

USPC .............................. 222/480, 565, 481, 142.1
See application file for complete search history.

(56) References Cited

U.S. PATENT DOCUMENTS

| | | |
|---|---|---|
| 604,112 A | 5/1898 | Fergusson |
| 604,492 A | 5/1898 | Fergusson |
| 928,052 A | 7/1909 | Hirsch |
| 1,715,169 A | 5/1929 | McKee |
| 2,504,905 A | 4/1950 | Toney |
| 2,567,211 A | 9/1951 | Jones |
| 2,898,010 A * | 8/1959 | Tepper ................. B65D 83/06 222/339 |
| 2,909,228 A | 10/1959 | Connors |
| 3,016,168 A | 1/1962 | Larson |
| 3,018,024 A | 1/1962 | Foord |
| 3,129,853 A | 4/1964 | Hoskins |
| 3,187,964 A | 6/1965 | Foster |
| 3,251,509 A | 5/1966 | Foster |

(Continued)

*Primary Examiner* — Patrick M. Buechner
*Assistant Examiner* — Michael J. Melaragno
(74) *Attorney, Agent, or Firm* — Reinhardt Boerner Van Deuren P.C.

(57) ABSTRACT

A container and container closures are provided as well as methods of dispensing product from the container are provided. The container closure includes a pair of cover members. One cover member includes sifting apertures and the other cover member is imperforate to prevent dispensing product. The container closure may also include a measuring volume that can be used to measure a predetermined amount of product to be dispensed. Sifting and bulk dispensing may occur for either product dispensed directly from the container or when dispensing the predetermined volume of product.

17 Claims, 24 Drawing Sheets

(56) References Cited

U.S. PATENT DOCUMENTS

| | | | |
|---|---|---|---|
| 3,254,811 A | 6/1966 | Harris | |
| 3,255,928 A | 6/1966 | Foster | |
| 3,370,757 A | 2/1968 | Foster | |
| 3,587,944 A | 6/1971 | Pehr | |
| 3,695,487 A | 10/1972 | Slayton et al. | |
| 3,866,805 A | 2/1975 | Hamilton, Jr. | |
| 4,032,050 A | 6/1977 | Funk | |
| 4,120,432 A * | 10/1978 | Fuchs | B65D 83/06 222/565 |
| 4,201,320 A | 5/1980 | Eppenbach | |
| 4,257,541 A | 3/1981 | Souza | |
| 4,345,700 A | 8/1982 | Souza | |
| 4,621,744 A | 11/1986 | Foster | |
| 4,898,292 A * | 2/1990 | VerWeyst | B65D 47/0847 215/237 |
| 4,961,521 A | 10/1990 | Eckman | |
| 5,052,572 A | 10/1991 | Pherigo | |
| 5,139,181 A | 8/1992 | Verweyst | |
| 5,183,171 A * | 2/1993 | Pherigo | B65D 47/0847 215/232 |
| 5,386,929 A | 2/1995 | Dutt et al. | |
| 5,465,871 A | 11/1995 | Robbins, III | |
| 5,469,992 A | 11/1995 | Jenkins | |
| 5,487,494 A | 1/1996 | Robbins, III | |
| 5,495,962 A | 3/1996 | Nomura | |
| 5,542,579 A | 8/1996 | Robbins, III | |
| 5,601,213 A | 2/1997 | Daniello | |
| 5,632,417 A | 5/1997 | Robbins, III et al. | |
| 5,676,282 A | 10/1997 | Satterfield | |
| 5,975,368 A | 11/1999 | Wood | |
| 6,053,183 A | 4/2000 | Rizzo | |
| 6,283,339 B1 | 9/2001 | Morrow | |
| 6,286,731 B1 * | 9/2001 | Lillelund | B65D 47/0895 222/480 |
| 6,299,033 B1 * | 10/2001 | VerWeyst | B65D 43/021 222/480 |
| 6,382,476 B1 * | 5/2002 | Randall | B65D 47/0885 215/237 |
| 6,419,130 B1 | 7/2002 | Chen | |
| 6,422,411 B1 | 7/2002 | Gray | |
| 6,601,734 B1 | 8/2003 | Smith | |
| 6,691,901 B2 * | 2/2004 | Parve | B65D 47/0847 215/245 |
| 6,948,641 B1 | 9/2005 | Williams | |
| 7,021,482 B2 | 4/2006 | Solowiejko | |
| 7,114,627 B2 | 10/2006 | Solowiejko | |
| D565,408 S | 4/2008 | Kick | |
| 7,451,901 B2 | 11/2008 | Ranney | |
| 7,712,638 B2 | 5/2010 | Kick | |
| 7,748,579 B1 | 7/2010 | Shin | |
| 7,909,212 B2 * | 3/2011 | Parve | B65D 47/0847 222/480 |
| 7,959,031 B2 | 6/2011 | Ranney | |
| 9,194,732 B2 | 11/2015 | Tarozzi et al. | |
| 9,663,286 B2 * | 5/2017 | Schmertz, Jr. | B65D 47/00 |
| 2007/0007310 A1 * | 1/2007 | Antal, Sr. | B65D 47/046 222/480 |
| 2007/0056972 A1 | 3/2007 | Solowiejko | |
| 2007/0145082 A1 * | 6/2007 | Parve | B65D 47/0857 222/480 |
| 2007/0278254 A1 | 12/2007 | Wisniewski | |
| 2008/0087690 A1 * | 4/2008 | Parve | B65D 47/0847 222/485 |
| 2008/0230543 A1 * | 9/2008 | Kick | B65D 47/0838 220/254.3 |
| 2014/0203050 A1 | 7/2014 | Blackburn | |
| 2014/0339268 A1 * | 11/2014 | Tarozzi | A47G 19/34 222/370 |
| 2015/0069061 A1 * | 3/2015 | Daggett | B65D 43/161 220/254.2 |
| 2016/0159532 A1 * | 6/2016 | Seager | G01F 11/00 53/492 |
| 2016/0227728 A1 * | 8/2016 | Taylor | A01K 1/0114 |
| 2017/0129658 A1 * | 5/2017 | Moody | B65D 47/0838 |
| 2017/0217647 A1 * | 8/2017 | Rosenbaum | B65D 83/06 |

* cited by examiner

US 10,569,942 B2

MEASURED VOLUME DISPENSING CLOSURE, CLOSURE HAVING OVERLAPPING COVER MEMBERS, AND METHODS

CROSS-REFERENCE TO RELATED PATENT APPLICATIONS

This patent application claims the benefit of U.S. Provisional Patent Application No. 62/569,114, filed Oct. 6, 2017, and U.S. Provisional Patent Application No. 62/652,412, filed Apr. 4, 2018, the entire teachings and disclosure of which are incorporated herein by reference thereto.

FIELD OF THE INVENTION

This invention generally relates to containers and more particularly closures for containers for dispensing product in a granular or powder state, such as for example spices.

BACKGROUND OF THE INVENTION

Containers are used for a plethora of goods, including organic or perishable items such as food or spices. The conventional lid for a spice container contains an array of small holes for dispensing the small sized contents, typically in the form of powders or small particles. The closure may have a first aperture that is large. The large first aperture is used for either scooping out or pouring large quantities of product. The first aperture is covered by a first door that is opened to dispense product. The closure may also include a second set of apertures that are covered by a second door. When the second door is opened, the product may be shaken out of the container through the plurality of apertures by sifting. Additional apertures may be present with corresponding doors.

Numerous spice container closures and/or containers are known as exemplified by U.S. Pat. Nos. 7,114,627; 7,021,482; 6,422,411; 5,052,572; 4,621,744; 3,370,757; 3,255,928; and 3,251,509; and U.S. Patent Publication No. 2007/0056972A1; all of which are assigned to the present assignee.

Often it is desirable to measure the amount of product. Numerous attempts have been tried to provide measuring capabilities in the closure itself.

The applicant has developed improvements to existing art of closures and containers to which the present disclosure is directed.

BRIEF SUMMARY OF THE INVENTION

A container is provided. The container includes a closure base, a measuring body, a first cover member and a second cover member. The closure base has a dispensing section having a first aperture extending therethrough and an imperforate section adjacent the dispensing section. The measuring body includes a measuring volume extending therethrough. The measuring body is rotatably attached to the closure base for rotation between a first rotational position wherein the measuring volume aligns with the first aperture and a second rotational position wherein measuring volume aligns with the imperforate section. The first cover member defines a plurality of apertures therethrough. The first cover member is hingedly attached to and is pivotable between a first position wherein the first cover member covers the measuring volume with the plurality of apertures in fluid communication with the measuring volume and a second position wherein the first cover member is pivoted away from the measuring volume. The second cover member is imperforate and hingedly attached for pivoting motion between a third position that covers the first cover and the measuring volume and a fourth position wherein the second cover member is pivoted away from the first cover member.

In an embodiment, the second cover member may be engageable with one of the first cover member, the closure base or the measuring body to inhibit pivoting of the second cover from the third position to the fourth position.

In an embodiment, the second cover member may engage the first cover member, the closure base or the measuring body. The second cover member prevents pivoting of the first cover member from the first position to the second position In an embodiment, when in the first position, the first cover member allows for dispensing product from the measured volume at a first rate. When in the second position, the first cover member allows for dispensing product from the measured volume at a second rate greater than the first.

In an embodiment, when in the first position, the apertures of first cover member combine to provide a first access to the measured volume. The first access has a first cross-sectional area. When in the second position with the first cover member pivoted away from the measuring volume, a second access to the measured volume is defined, the second access has a second cross-sectional area being greater than the first cross-sectional area.

In an embodiment, the closure base is unitarily formed with a container bottom.

In an embodiment, the first and second cover members are unitarily formed with the measuring body and the first cover member is attached to the measuring body with a living hinge and the second cover member is attached to the measuring body with a living hinge.

In an embodiment, a first catch structure releasably secures the first cover member in the first position and a second catch structure releasably secures the second cover member in the third position.

In an embodiment, a rotation limiting system is provided between the closure base and the measuring body that allows the measuring body to rotate relative to the closure base a predetermined angular amount such that the measuring body can only be rotated from the first rotational position to the second rotational position in a first direction and can only be rotated from the second rotational position to the first rotational position in a second direction being opposite the first direction.

In an embodiment, the rotation limiting system is provided by angularly spaced apart first and second abutments provided by one of the closure base and the measuring body and a third abutment provided by the other one of the closure base and the measuring body. The third abutment is positioned angularly between the pair of angularly spaced apart first abutments. The third abutment angularly abuts the first abutment in the first rotational position and the third abutment angularly abuts the second abutment in the second rotational position.

In an embodiment, the closure base is configured to be attached to an open end of a container bottom with the open end of the container bottom in fluid communication with the first aperture of the closure base.

A container is provided including a container closure as outlined above. The container includes a container bottom having a cavity for holding product to be dispensed. The container bottom has an open end. The closure base is operably attached to the container bottom. The cavity of the container bottom is in fluid communication with the first aperture of the closure base. Product is dispensed from the container bottom through the container closure.

In an embodiment, the closure base is positioned axially between the container bottom and the measuring body.

In an embodiment, all product dispensed from the container bottom passes through the measuring volume of the measuring body.

A method of dispensing product from any container outlined above includes: aligning the first aperture of the closure base with the measuring volume of the measuring body; tipping the container upside down such that the container bottom is gravitationally vertically above the container closure; aligning the imperforate section of the closure base with the measuring volume; tipping the container right side up such that the container bottom is gravitationally vertically below the container closure, the imperforate section of the closure base preventing product from within the measuring volume from transferring back into the cavity of the container bottom; selecting whether to bulk dispense or sift the product from the measuring volume; pivoting the second cover member to the fourth position; and pivoting the first cover member to the second position if bulk dispensing is selected or leaving the first cover member in the first position if sift is selected.

In an embodiment, the step of tipping the container upside down occurs when the second cover member is in the third position.

A further container closure includes a base component, a first cover member and a second cover member. The base component has an aperture extending therethrough. The first cover member defines a plurality of apertures therethrough. The first cover member is hingedly attached for pivoting motion relative to the base component. The first cover member is pivotable between a first position wherein the first cover member covers the aperture in the base component with the plurality of the apertures in fluid communication with the aperture in the base component to permit sifting and a second position wherein the first cover member is pivoted away from the aperture in the base component to permit bulk dispensing. The second cover member is imperforate and hingedly attached for pivoting motion relative to the base component between a third position that covers the first cover member and the aperture in the base component and prevents dispensing of product and a fourth position wherein the second cover member is pivoted away from the first cover member and permits dispensing of product.

In an embodiment, the base component, first cover member and second cover member are formed as a single continuous piece of material.

In an embodiment, the second cover member prevents product from being dispensed through the plurality of apertures in the first cover member when in the third position.

A method of dispensing product from a container including a container bottom attached to a container as previously described includes sifting product from the container bottom by dispensing product with the first cover member in the first position and the second cover member in the fourth position; bulk dispensing product from the container bottom by dispensing product with the first cover member in the second position and the second cover member in the fourth position; and wherein product passes through the aperture in the base component when sifting and when bulk dispensing.

In an embodiment, a container closure including a base component, a first cover member, a first hinge, a second cover member and a second hinge is provided. The base component has an aperture extending therethrough. The first cover member defines a plurality of apertures therethrough. The first hinge hingedly attaches the first cover member for pivoting motion relative to the base component. The first cover member is pivotable through the first hinge between a first position and a second position. In the first position, the first cover member covers the aperture in the base component with the plurality of the apertures in fluid communication with the aperture in the base component. In the second position, the first cover member is pivoted away from the aperture in the base component. The first cover member includes a contact region spaced away from the first hinge. The second cover member is imperforate and includes a plurality of plugs extending from an inner side of the second cover member. The second cover member includes a sliding region on the inner side of the second cover member. The second hinge hingedly attaches the second cover member for pivoting motion relative to the base component between a third position and a fourth position. In the third position, the second cover member covers the first cover member and the aperture in the base component. In the fourth position, the second cover member is pivoted away from the first cover member. The plugs of the second cover member align with and close the plurality of apertures in the first cover member when the second cover member is in the third position. The contact region of the first cover member slidingly engages the sliding region when the second cover member transitions the first cover member from the second position toward the first position as the second cover member transitions from the fourth position toward the third position.

In one embodiment, the plurality of plugs includes a first set of plugs and a second set of plugs. The sliding region is interposed between and separates the first set of plugs from the second set of plugs. The contact region slides between the first and second sets of plugs during closing operations.

In one embodiment, the contact region is formed as a farthest most point of the first cover member from the first hinge.

In one embodiment, the first cover member includes a body portion through which the plurality of apertures extends and a projection extending outward from the body portion away from the first hinge. The contact region is provided by the projection.

In one embodiment, at least one of the plurality of plugs has a tapered profile such that the at least one of the plurality of plugs extends increasingly farther from the inner side of the second cover member when moving away from the sliding region.

In one embodiment, the first cover member includes a body portion through which the plurality of apertures extends and a projection extending outward from the body portion away from the first hinge. The contact region is provided by the projection. A portion of the projection extends over (e.g. overlaps) but does not contact the at least one of the plurality of plugs that has the tapered profile when the second cover member transitions the first cover member from the second position toward the first position as the second cover member transitions from the fourth position toward the third position.

In one embodiment, the first cover member includes a body portion through which the plurality of apertures extends and a projection extending outward from the body portion away from the first hinge. The contact region is provided by the projection.

In one embodiment, the base component includes a recess. The projection extends into the recess when the second cover member is in the third position.

In one embodiment, the sliding region is provided by a rib extending outward from the inner side of the second cover member. The rib extending lengthwise transverse to the second hinge.

In one embodiment, at least one end of the rib includes a tapered section.

In one embodiment, the first cover member snap engages with the base component to prevent pivoting from the first position toward the second position. The tapered section contacts the first cover member when the first cover member is in the first position and the second cover member is in the third position to bias the first cover member into snap engagement with the base component.

In one embodiment, a second end of the rib, opposite the at least one end of the rib, includes a tapered section.

In one embodiment, the sliding region is provided by a portion of the inner side of the second cover member. The sliding region being substantially coplanar with the portion of the inner side of the lid from which the plugs project.

In one embodiment, the first cover member includes a second contact region and the second cover member includes a second sliding region. The second contact region of the first cover member slidingly engages the second sliding region when the second cover member transitions the first cover member from the second position to the first position as the second cover member transitions from the fourth position to the third position.

In one embodiment, the first cover member includes a body portion defines an outer surface and an inner surface that are generally planar and parallel to one another. The inner and outer surfaces are offset from one another along an axis being orthogonal to the inner and outer surfaces. The plurality of apertures extend entirely through the body portion. At least one of the plurality of apertures extends through the body portion in a tapered configuration such that the aperture gets smaller in cross-section when moving from the inner surface toward the outer surface.

In one embodiment, the sliding region extends lengthwise away from the second hinge a distance farther than the position of at least one of the plurality of plugs relative to the second hinge. The contact region slides along the sliding region past the at least one of the plurality of plugs when the second cover member transitions the first cover member from the second position to the first position as the second cover member transitions from the fourth position to the third position.

In another embodiment, a method of closing a container closure is provided. The method uses container closures including a contact region and a sliding region as outlined above. The method includes pivoting the second cover member from the fourth position toward the third position about the second hinge by applying a force to the second cover member. The method includes contacting the sliding region with the contact region by pivoting the second cover member relative to the base component. The method includes pivoting the first cover member from the second position toward the first position about the first hinge by applying a force to the first cover member via sliding engagement between the sliding region and the contact region.

In another embodiment, a container is provided. The container includes a container closure as outlined above and a container bottom having a cavity for holding product to be dispensed. The container bottom has an open end, the closure base operably attached to the container bottom. The cavity of the container bottom is in fluid communication with the first aperture of the closure base. Product is dispensed from the container bottom through the container closure.

In another embodiment, a container closure including a base component, a first cover member, a first hinge, a second cover member, and a second hinge is provided. The base component has an aperture extending therethrough. The first cover member includes a body portion defining an outer surface and an inner surface that are generally planar and parallel to one another. The inner and outer surfaces are offset from one another along an axis being perpendicular to the inner and outer surfaces. A plurality of apertures extend entirely through the body portion (e.g. through the inner and outer surfaces). The plurality of apertures extend through the body portion in a tapered configuration such that the aperture gets smaller in cross-section when moving from the inner surface toward the outer surface. The first hinge hingedly attaches the first cover member for pivoting motion relative to the base component. The first cover member is pivotable through the first hinge between a first position wherein the first cover member covers the aperture in the base component with the plurality of the apertures in fluid communication with the aperture in the base component and a second position wherein the first cover member is pivoted away from the aperture in the base component. The outer surface of the body portion faces away from the aperture in the base component when the first cover member is in the first position. The second cover member is imperforate and includes a plurality of plugs extending from an inner side of the second cover. The second hinge hingedly attaches the second cover member for pivoting motion relative to the base component between a third position that covers the first cover member and the aperture in the base component and a fourth position wherein the second cover member is pivoted away from the first cover member. The plugs of the second cover member align with and close the plurality of apertures in the first cover member when the second cover member is in the third position.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
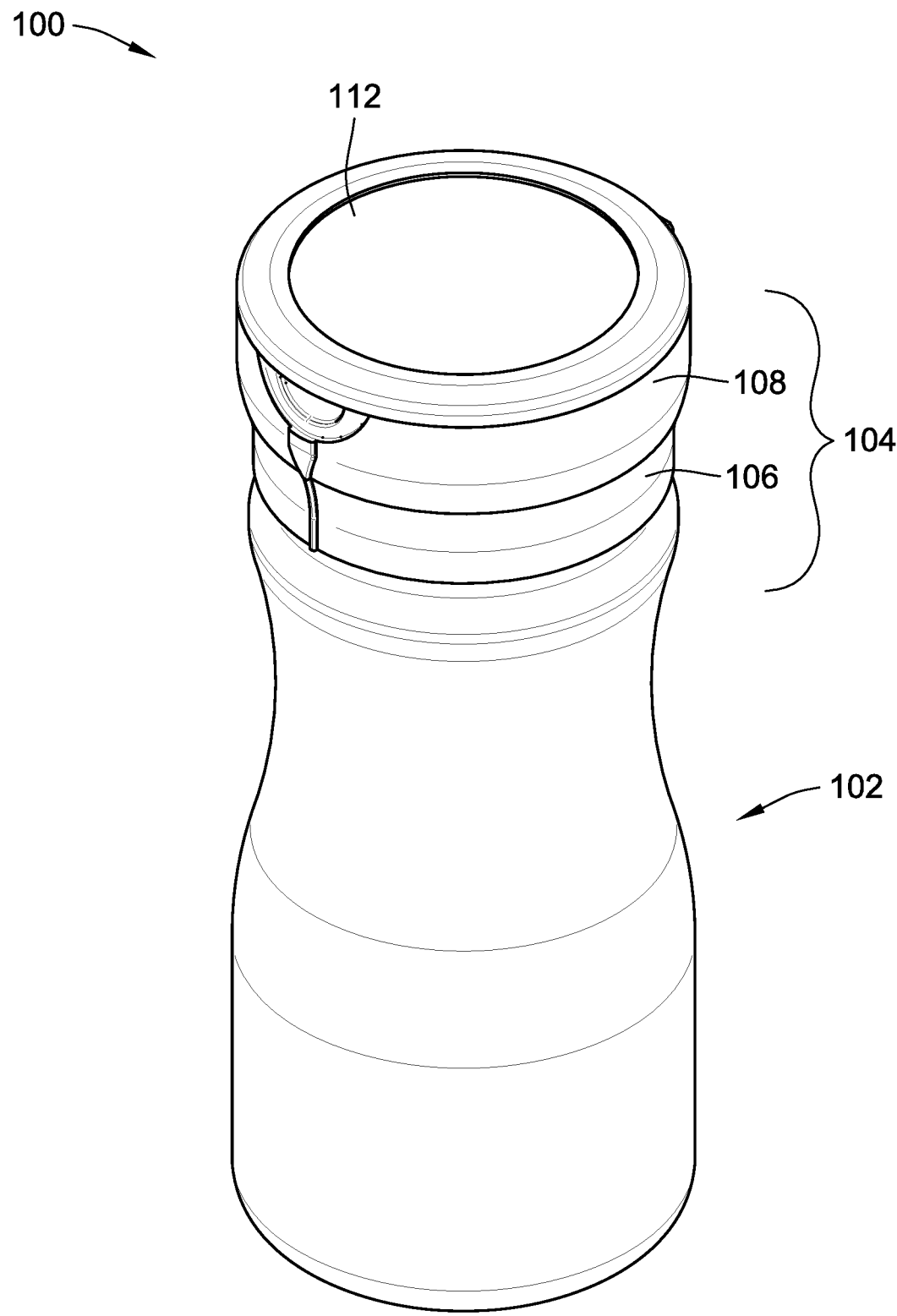
FIG. 1 is a perspective illustration of a container.

FIG. 1 illustrates a dispensing container 100 (also referred to as "container 100") according to an embodiment of the present invention. The container 100 particular applicability for use with products such as spices that are either in a granular or powder state. The container 100 includes a container bottom 102 and a container closure 104. The container bottom 102 stores product to be dispensed. Further, as will be more fully described below, the container 100 is configured to allow a user to dispense a predetermined volume of material without requiring any external measuring device.

Figure 2:
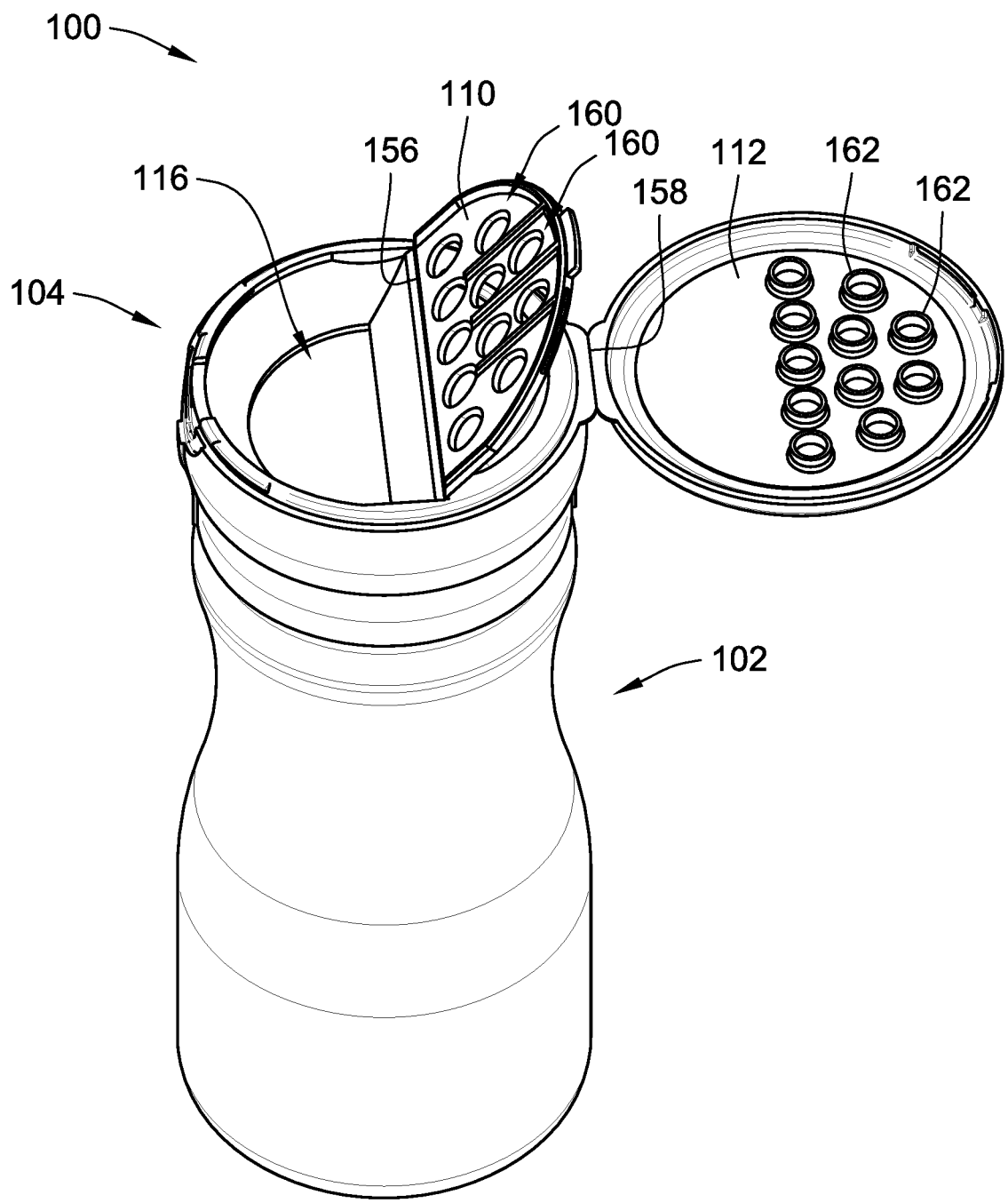
FIG. 2 is a perspective illustration of the container of FIG. 1 with both cover members in an open state.
Figure 3:
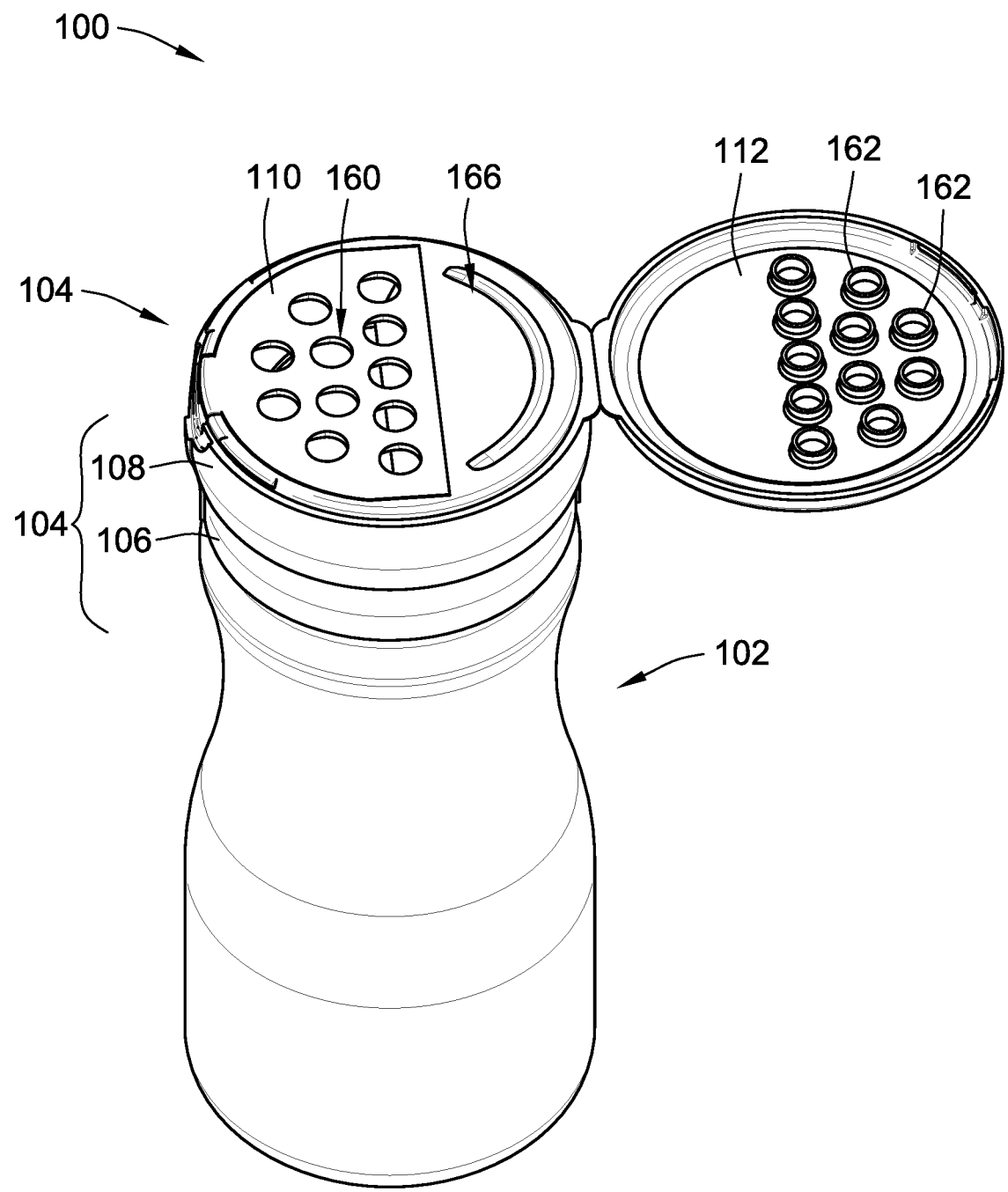
FIG. 3 is a perspective illustration of the container of FIG. 1 with one cover member in a closed state and the other cover member in an open state.
Figure 4:
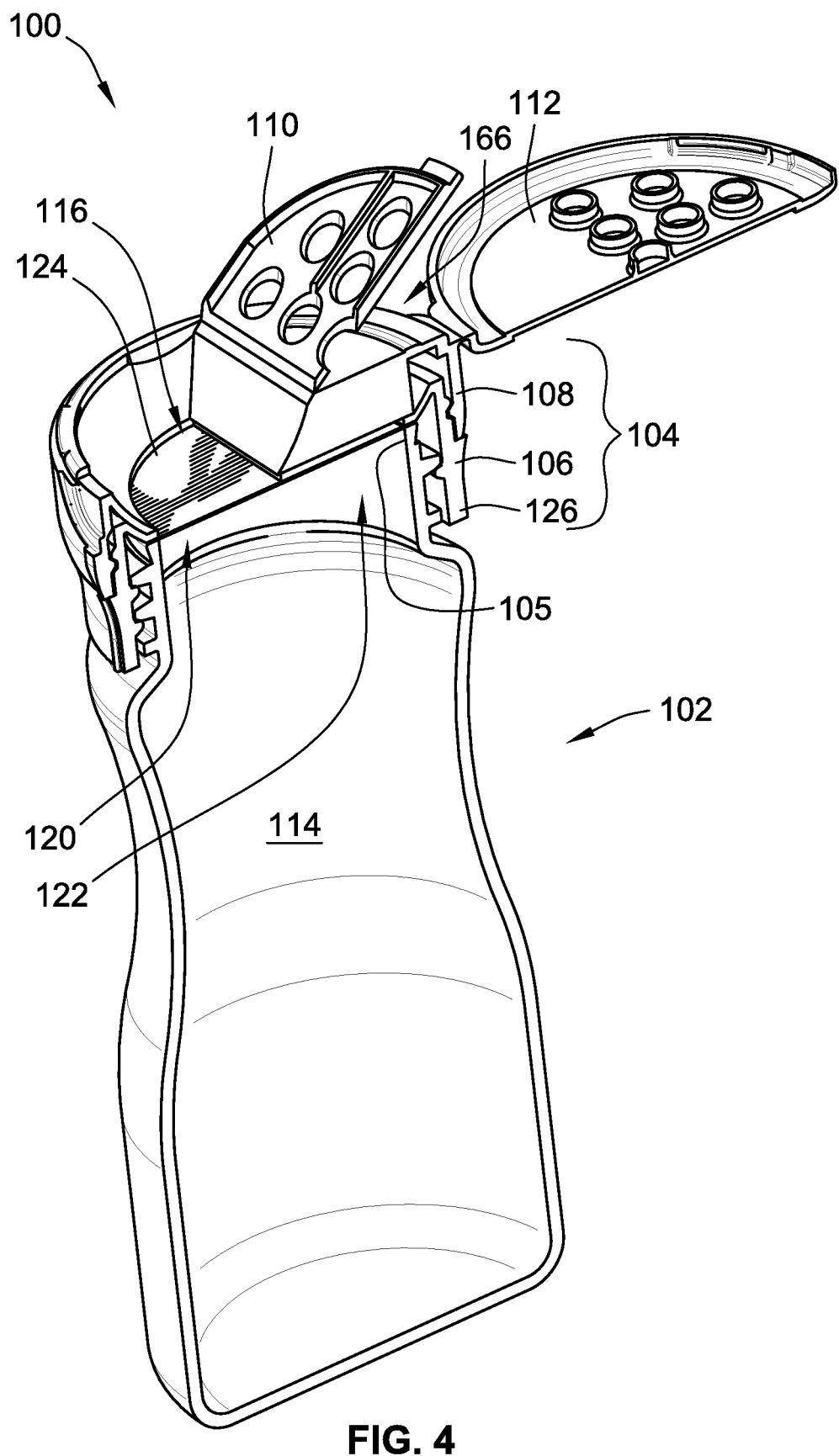
FIG. 4 is a cross-sectional illustration of the container with both cover members in an open state.

With additional reference to FIGS. 2-4, the container closure 104 attaches to an open end 105 of the container bottom 102. The container closure 104 includes a closure base 106, a measuring body 108, a first cover member 110 and a second cover member 112. The container closure 104 allows a user to dispense product directly from an internal storage cavity 114 (FIG. 4) of the container bottom 102 or to measure and dispense a predetermined volume of product. Further, the container closure 104 is configured to allow for either bulk pouring of the product or sifting of the product from either the storage cavity 114 or from the predetermined measured volume.

FIG. 1 illustrates the container 100 in a fully closed condition. FIG. 2 illustrates the container 100 in a fully open condition where product can be poured from the container 100. FIG. 3 illustrates the container in a partially open condition where product can be dispensed using a sifting action.

Figure 5:
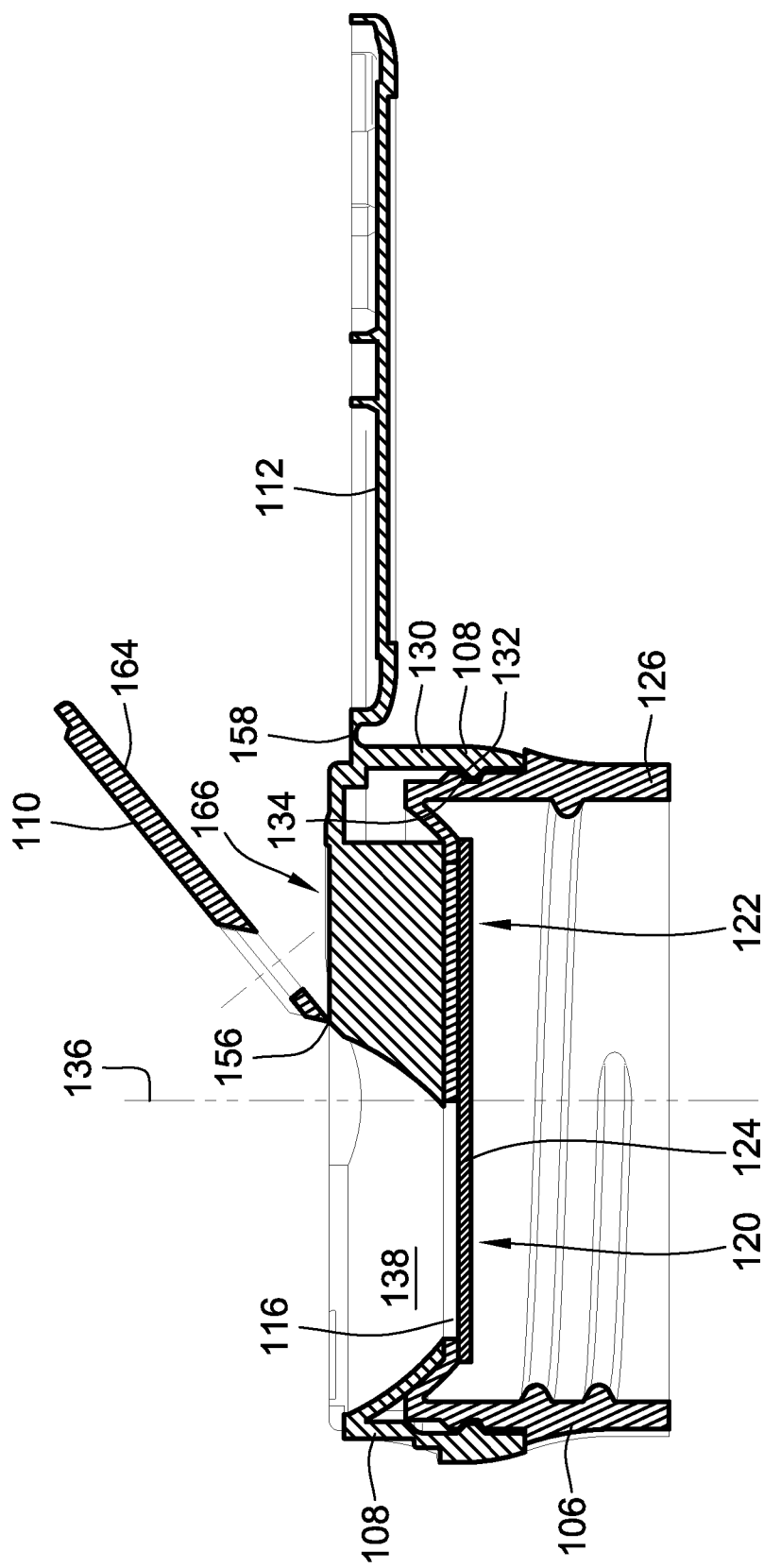
FIG. 5 is a cross-sectional illustration of the container closure of the container of FIG. 1 with both cover members in an open state.
Figure 6:
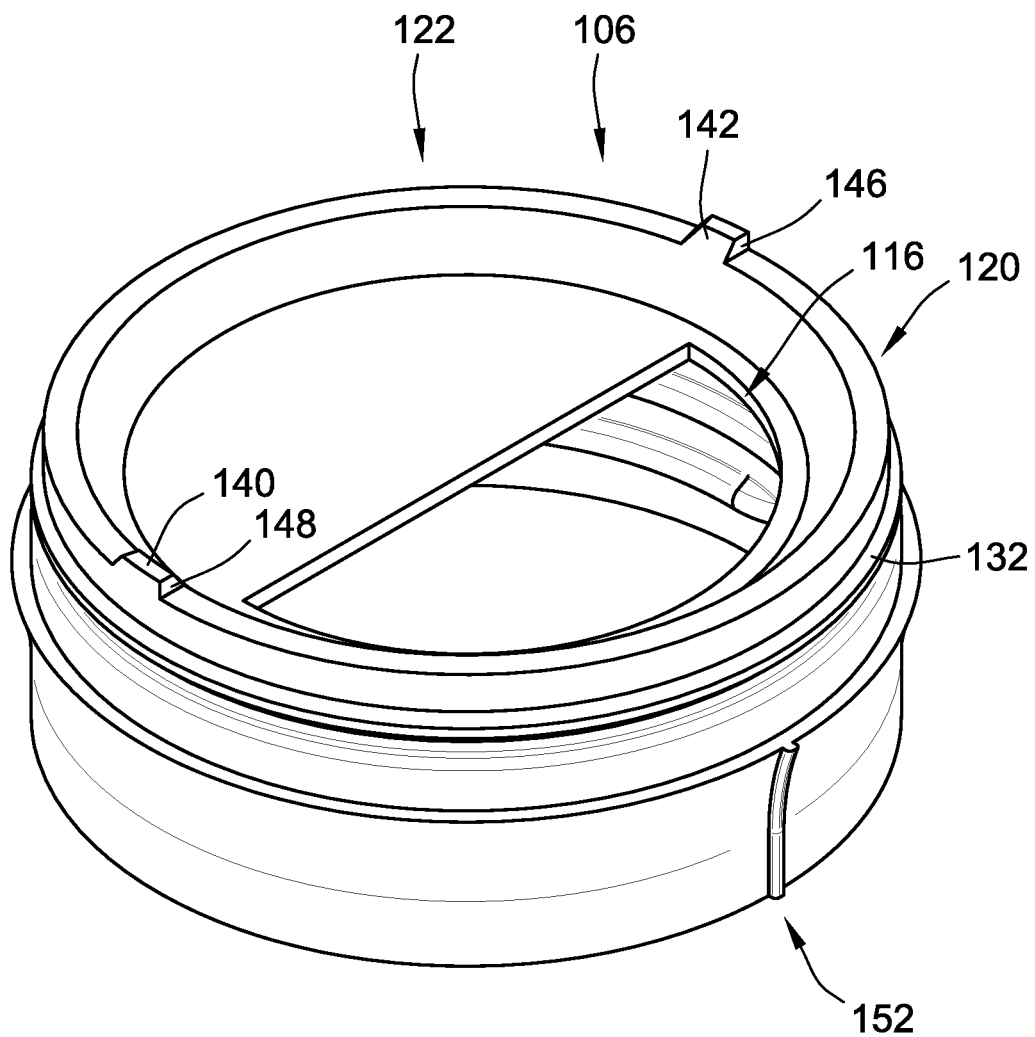
FIG. 6 is a perspective illustration of the closure base of the container closure of FIG. 1.

With reference to FIGS. 4-6, the closure base 106, in this embodiment, is configured to be attached to the container bottom 102 proximate the open end 105 thereof. In this embodiment, the container bottom 102 and closure base 106 have cooperating threading to secure the closure base, and consequently the container closure 104, to the container bottom 102. In alternative embodiments, the closure base 106 and container bottom 104 could be snap engaged, welded, or adhesively secured. In further embodiments, the closure base 106 can be unitarily formed with the rest of the container bottom 102 as a single continuous piece of material.

The closure base 106 has an aperture 116 formed in a dispensing section 120 through which product within storage cavity 114 exits the container bottom 102. Adjacent the dispensing section 120 is an imperforate section 122. The imperforate section 122 prevents product from passing through the closure base 106 at that location.

It should be noted that the illustrated embodiment includes a freshness seal 124 (see FIGS. 4 and 5) that covers aperture 116 prior to initial use. The freshness seal 124 can provide tamper evidence to the user and maintain freshness of the product prior to initial use. The freshness seal 124 is removed by the user when it is desired to dispense product for the first time and is not replaced after use. While illustrated as attached to the closure base 106, the freshness seal 124 could be applied to the open end 105 of the container bottom 102.

In this embodiment, the closure base 106 includes an annular skirt 126 that is internally threaded that receives the externally threaded open end 105 of the container bottom 102.

With reference to FIG. 5, the measuring body 108 is rotatably attached to the closure base 106. The measuring body 108 includes an outer annular skirt 130 that axially receives an end of the closure base 106 and snap engages with the closure base 106. More particularly, the closure base 106 defines a radially outward opening groove 132 that receives radially inward extending projection 134 formed on an inner surface of outer annular skirt 130. The projection 134 could be a continuous annular projection or could be discontinuous. Further, the groove 132 and projection 134 could be reversed. The groove 132 extends around the outer periphery of the closure base 106 and provides a track in which the projection 134 can slide as the closure base 106 and measuring body 108 are rotated relative to one another about axis 136.

Figure 7:
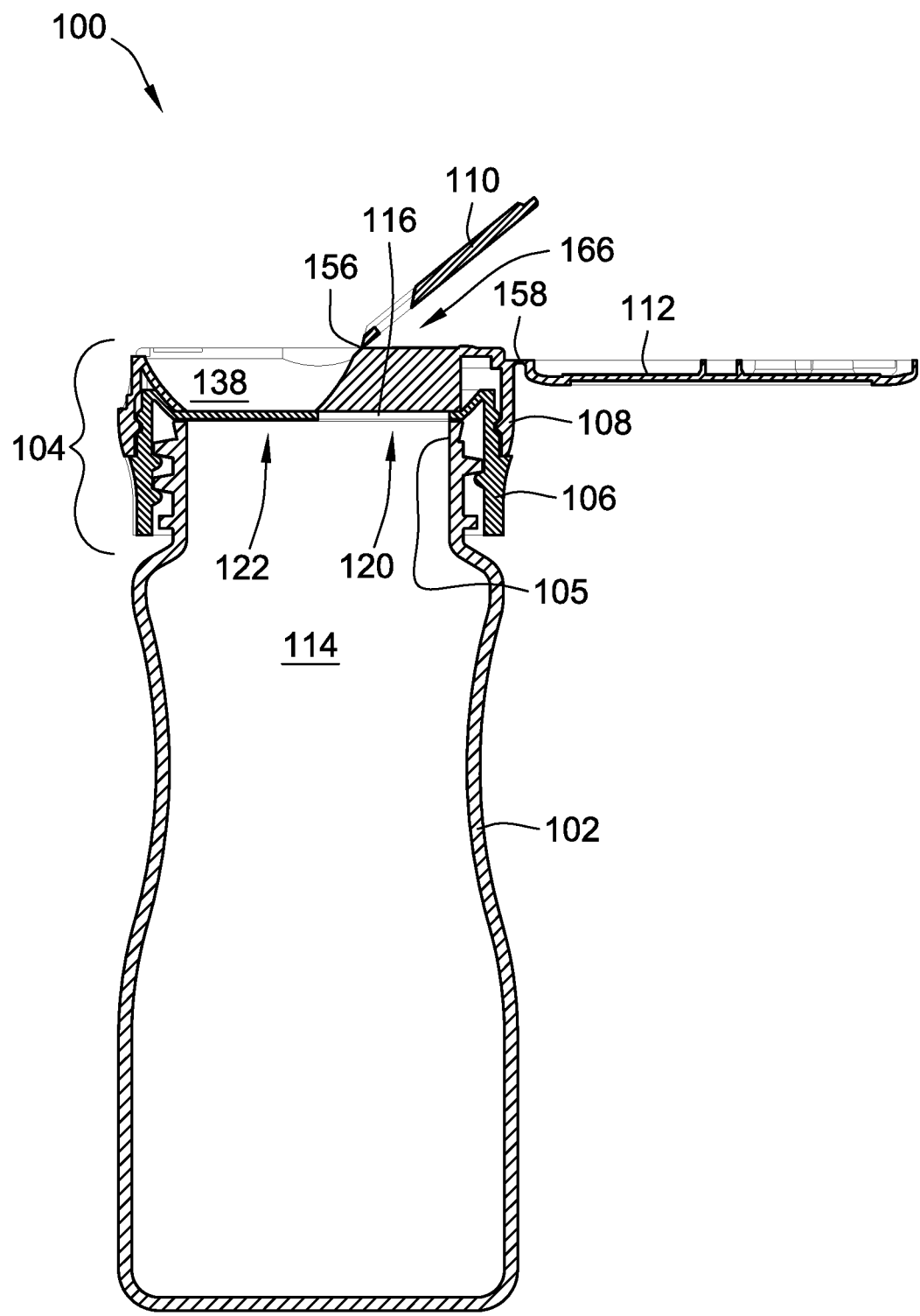
FIG. 7 is a cross-sectional illustration of the container with the measuring body rotated relative to the closure base when dispensing a predetermined volume of product.
Figure 8:
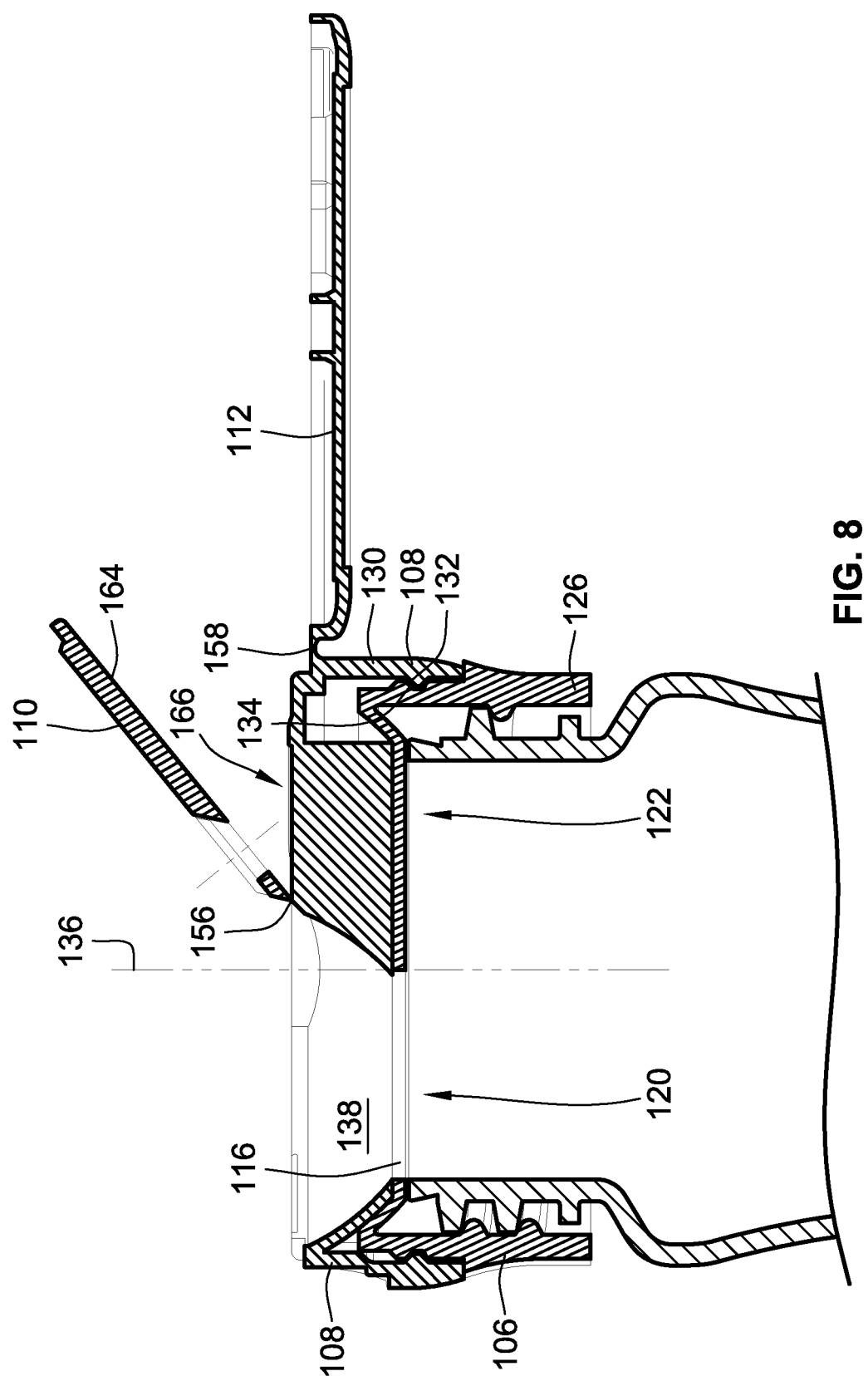
FIG. 8 is an enlarged illustration of FIG. 7 in a alternative rotated position.
Figure 9:
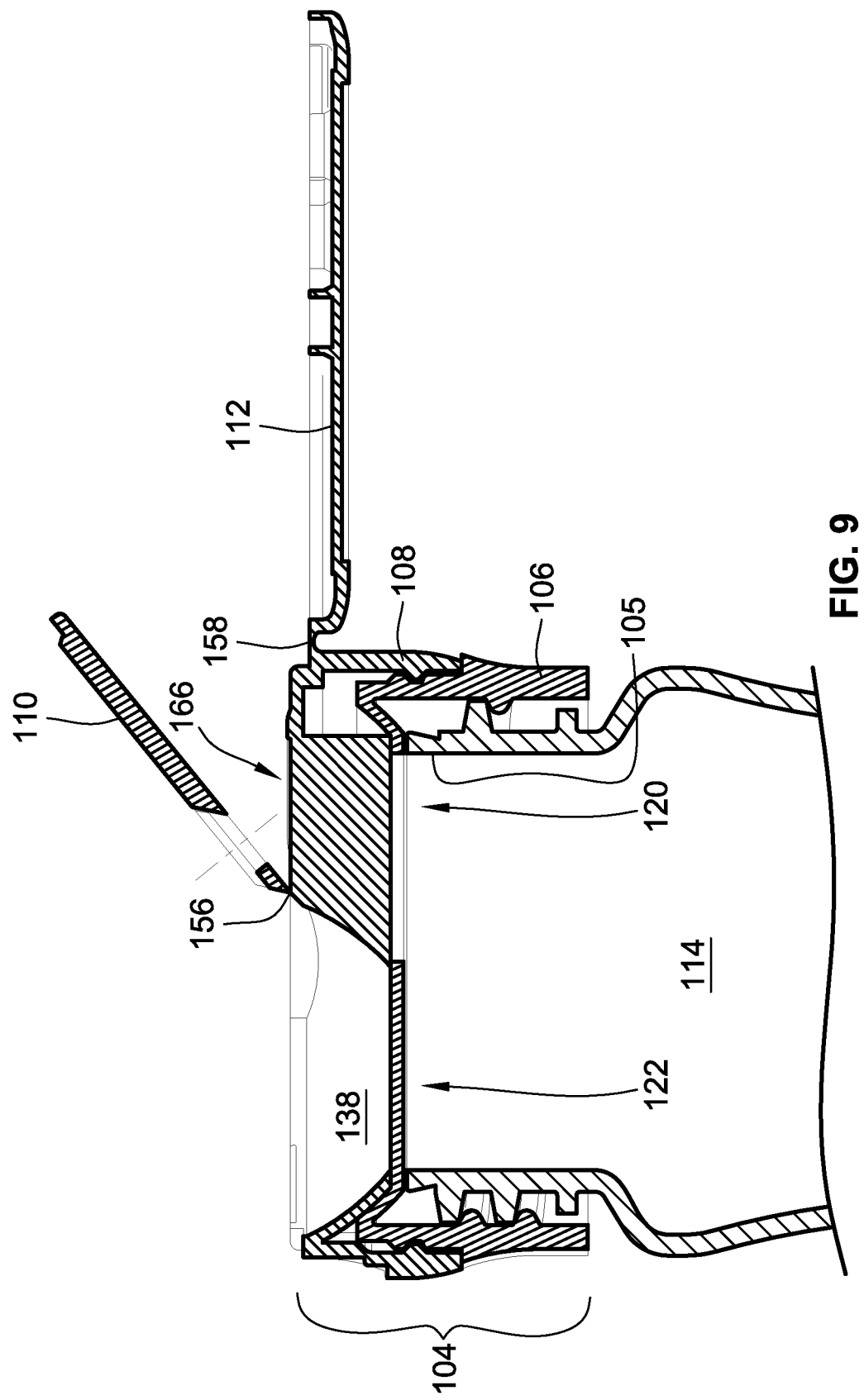
FIG. 9 is an enlarged illustration of FIG. 7.

The measuring body 108 defines a measuring volume 138 that extends through the measuring body 108. The measuring body 108 is rotatable between a first rotational position (FIGS. 4, 5 and 8) and a second rotational position (FIGS. 7 and 9). In the first rotational position, the measuring volume 138 is adjacent the dispensing section 120 and is in fluid communication with aperture 116 and, consequently, with the internal storage cavity 114 of the container bottom 102. If the freshness seal 124 were removed from the container, this would be illustrated in FIGS. 4 and 5. However, the freshness seal 124 has not yet been removed in FIGS. 4 and 5. In the second rotational position, the measuring body 108 has been rotated such that the measuring volume 138 is adjacent the imperforate section 122 and is no longer in fluid communication with aperture 116 or internal storage cavity 114.

As such, when a user wants to measure a predetermined volume of product, the predetermined volume being equal to the measuring volume 138, the user aligns the measuring volume 138 with aperture 116. The user then flips the container 100 upside down. The user will then rotate the measuring body 108 relative to the closure base 106 such that the measuring volume 138 is adjacent with the imperforate section 122. Thereafter, the user is able to flip the container 100 right side up with a predetermined amount of product stored within the measuring volume 138. The imperforate section 122 prevents communication between the measuring volume 138 and the container bottom 102. Thereafter, the user may dispense the measured volume of product by opening one or both of the cover members 110, 112.

It shall be noted that when dispensing either a measured volume or directly from the storage cavity 114 of the container bottom 102, all product will pass through the measuring volume 138 of the measuring body 108.

Figure 10:
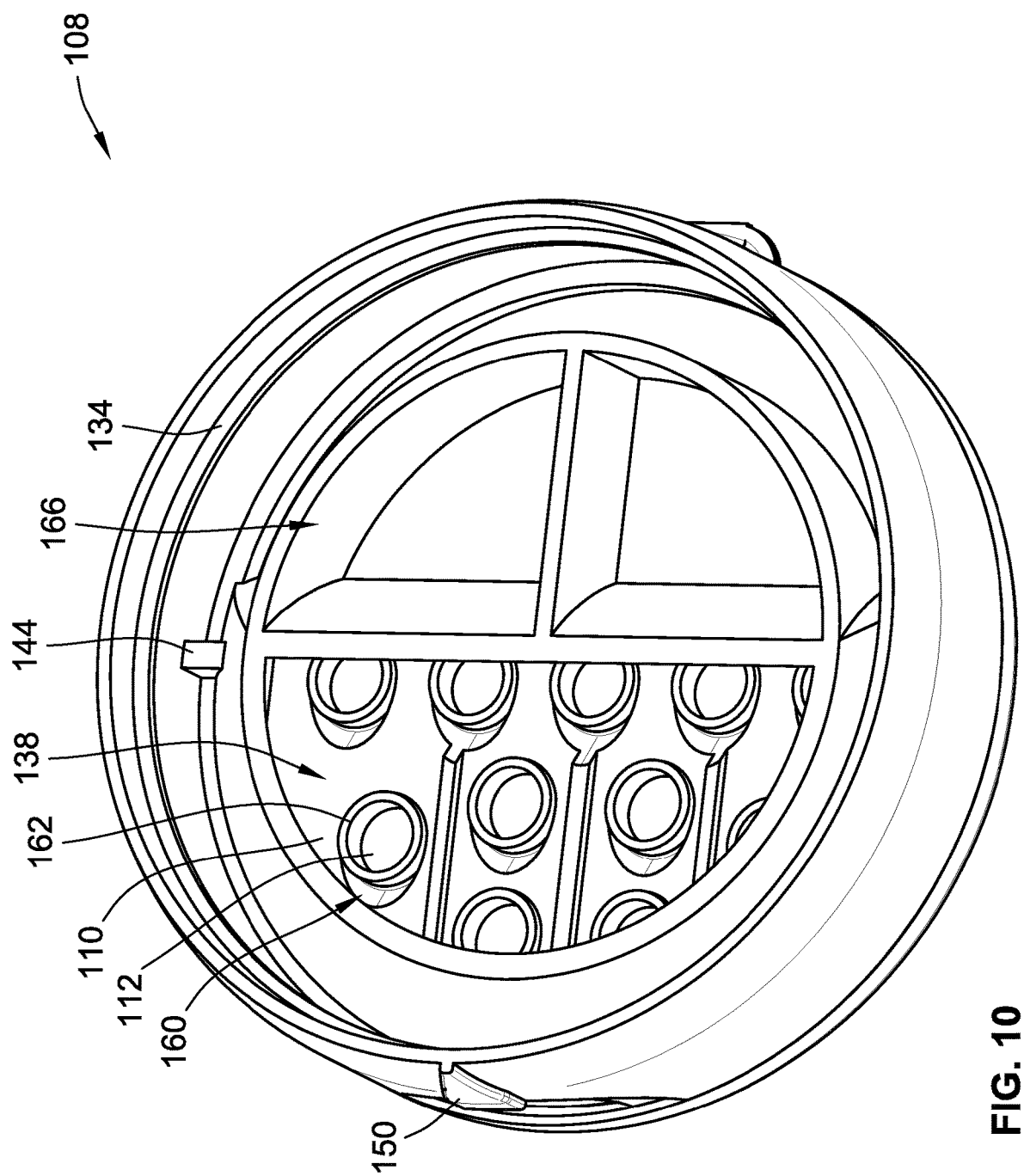
FIG. 10 is a bottom perspective illustration of the measuring body and first and second cover members in a closed state.

With reference to FIGS. 6 and 10, a rotation limiting system is provided between the closure base 106 and measuring body 108. The rotation limiting system only allows the measuring body to rotate relative to the closure base a predetermined angular amount and prevents over rotating between the closure base 106 and measuring body 108 such that the two rotational positions can be easily maintained. Further, the measuring body 108 will only be able to rotate in a first direction from the first rotational position to the second rotational position and can only rotate from the second rotational position to the first rotational position in a second direction, opposite the first direction.

In the illustrated embodiment, the rotation limiting system includes a plurality of axially extending projections that define abutments. More particularly, the closure base 106 includes a pair of axially extending projections 140, 142 that are angularly spaced apart (see FIG. 6). Further, the measuring body 108 includes axially extending projection 144 (see FIG. 10). When assembled, projection 144 will be positioned between projections 140, 142 and will angularly abut an abutment surface 146 of projection 142 in the first rotational position and will angularly abut an abutment surface 148 of projection 140 in the second rotational position.

Figure 11:
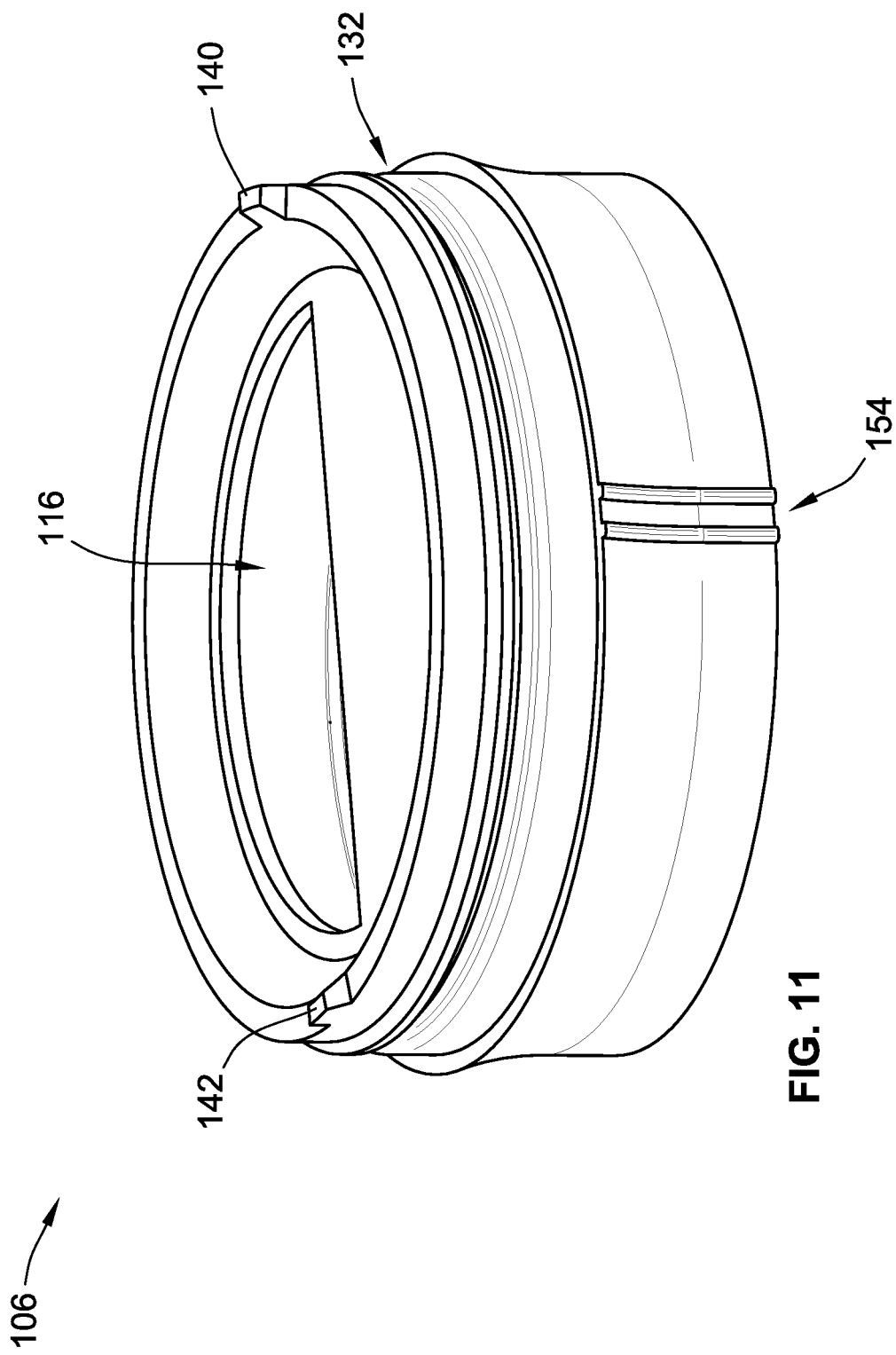
FIG. 11 is a further perspective illustration of the closure base of the container of FIG. 1.
Figure 12:
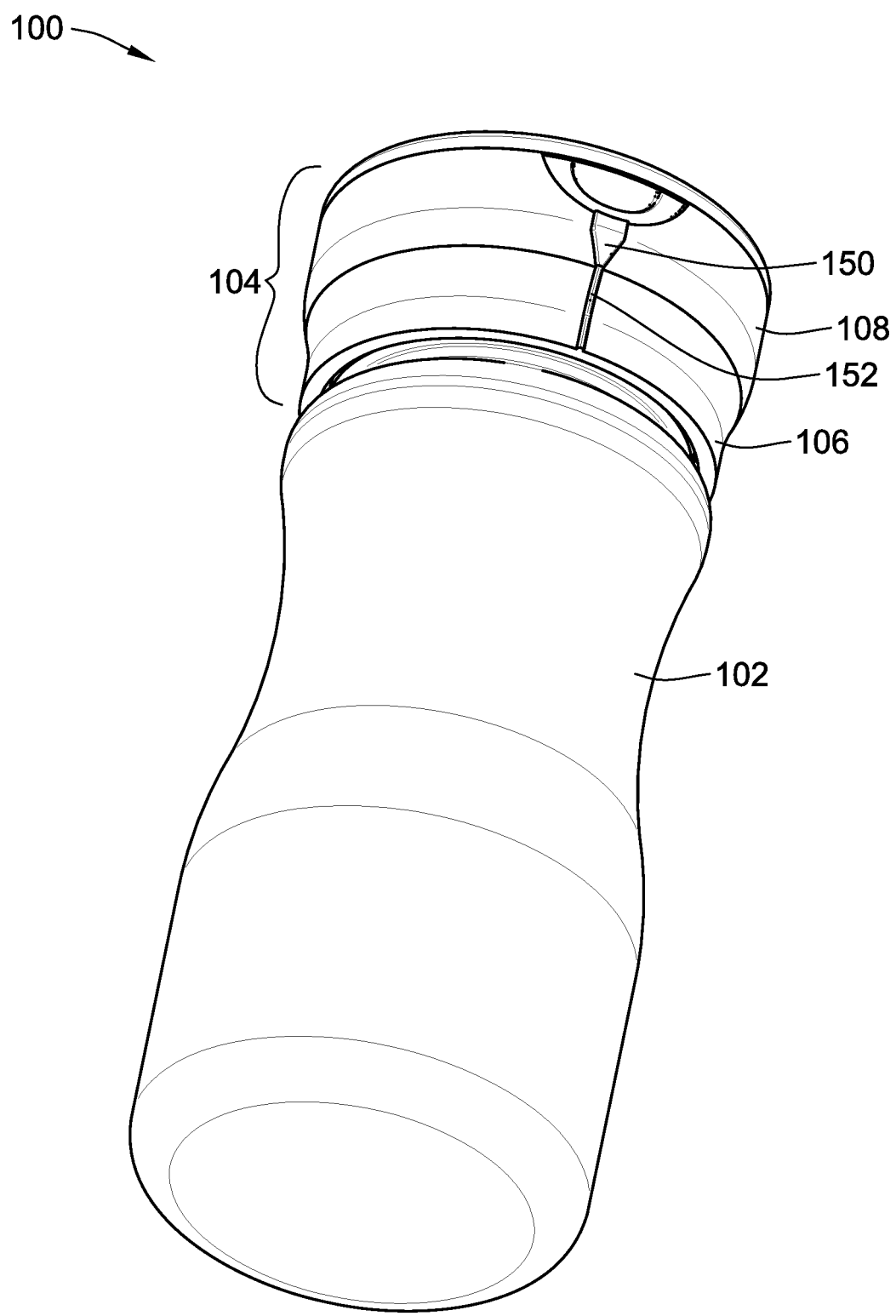
FIGS. 12 and 13 are further perspective illustrations of the container of FIG. 1.
Figure 13:
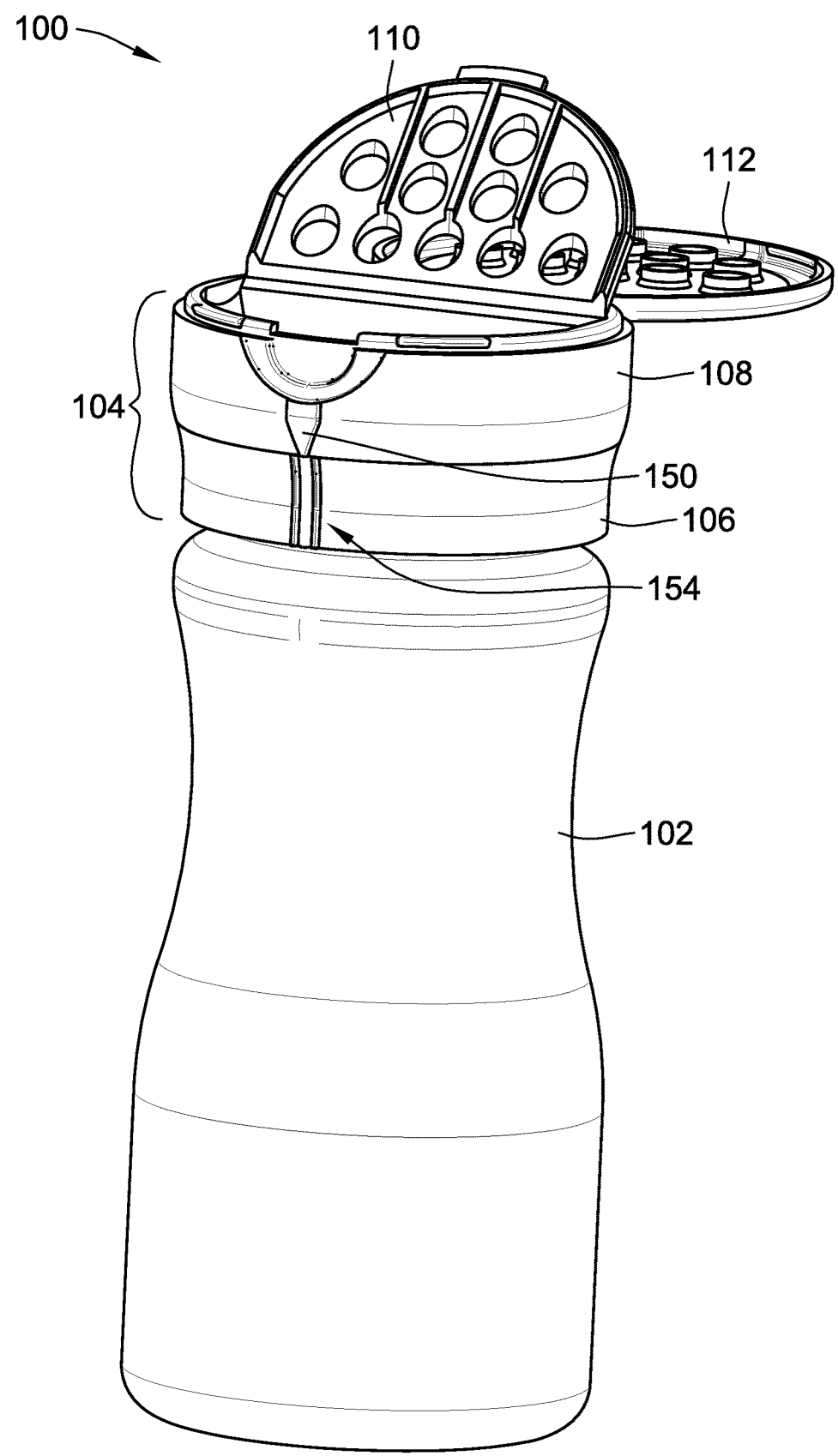

The container closure 104 includes identifying markings to help identify which position the container closure 104 is in. More particularly, the measuring body 108 includes indicator 150 (see FIG. 12) and closure base 106 includes first indicator 152 (FIGS. 6 and 12) and second indicator 154 (FIGS. 11 and 13). When indicator 150 of the measuring body 108 aligns with first indicator 152 (See FIG. 12), the measuring body 108 is in the first rotational position and product can be transferred into the measuring volume 138. When indicator 150 aligns with the second indicator 154 (See FIG. 13, e.g. between the pair of lines), the measuring body 108 is in the second rotational position and product is prevented from being transferred back into the container bottom 102.

With reference to, among others, FIGS. 2 and 5, the first and second cover members 110, 112 are hingedly attached to the measuring body 108 by hinges 156, 158. In the illustrated embodiment, the first and second cover members 110, 112 are unitarily formed with the measuring body 108 as a continuous piece of material and the hinges 156, 158 are living hinges. However, in other embodiments, the first and second cover members 110, 112 could be separately formed components and other non-living hinges could be employed. Further, the hinges 156, 158 for the first and second cover members 110, 112 are generally parallel to one another The first cover member 110 includes a plurality of apertures 160 therethrough (see FIG. 2). The first cover member 110 is pivotable between a first position (FIG. 3) and a second position (FIG. 2). In the first position, the first cover member 110 covers the measuring volume 138 such that product that is dispensed from the container 100 is sifted. It is noted that sifting can occur with either dispensing directly from cavity 114 or when dispensing a measured volume. In the second position, the first cover member 110 is spaced away from the measuring volume 138 to allow for pouring or potentially scooping of product from the container. The flow rate of product through the plurality of apertures 160 when in the first position is typically slower than when in the second position as the access defined by the combined cross-sectional area of the plurality of holes 160 is smaller in than the access defined by the opening to the measuring volume 138 (e.g. the open end of measuring volume 138 on a side opposite the container bottom 102).

The second cover member 112 is generally imperforate. The second cover member 112 acts as a lid or closure that can prevent dispensing any product from the container 100. The second cover member 112 is pivotable between a first position (FIG. 1) that prevents dispensing of product and a second position (FIG. 2) that allows dispensing of product.

The second cover member 112 includes axial projections 162 that form plugs for plugging apertures 160 in the first cover member 110 when the second cover member 112 is in the first position (e.g. FIG. 1). These projections 162 may snap engage into apertures 160 or simply fit within the apertures. This helps prevent product from getting positioned between the first and second cover members 110, 112 when not in use or when using the measuring feature of the container 100, e.g. while loading the measuring volume 138. Alternative embodiments need not include the projections 162. Instead, the second cover member 112 can be configured to press up against the outer surface 164 (FIG. 5) of the first cover member 110.

The measuring body 108 also includes an imperforate region 166 (see FIGS. 5 and 10) that aligns with and covers aperture 116 in the closure base 106 when in the second rotational position (see e.g. FIG. 7). This prevents product from spilling out of the container bottom 102 and cavity 114 when dispensing a predetermined volume of product from measuring volume 138. Further, this also prevents product from spilling back into the container bottom 102 after a predetermined amount of product has been measured and dispensed into the measuring volume 138, when it is desired to dispense a predetermined amount of product.

Figure 14:
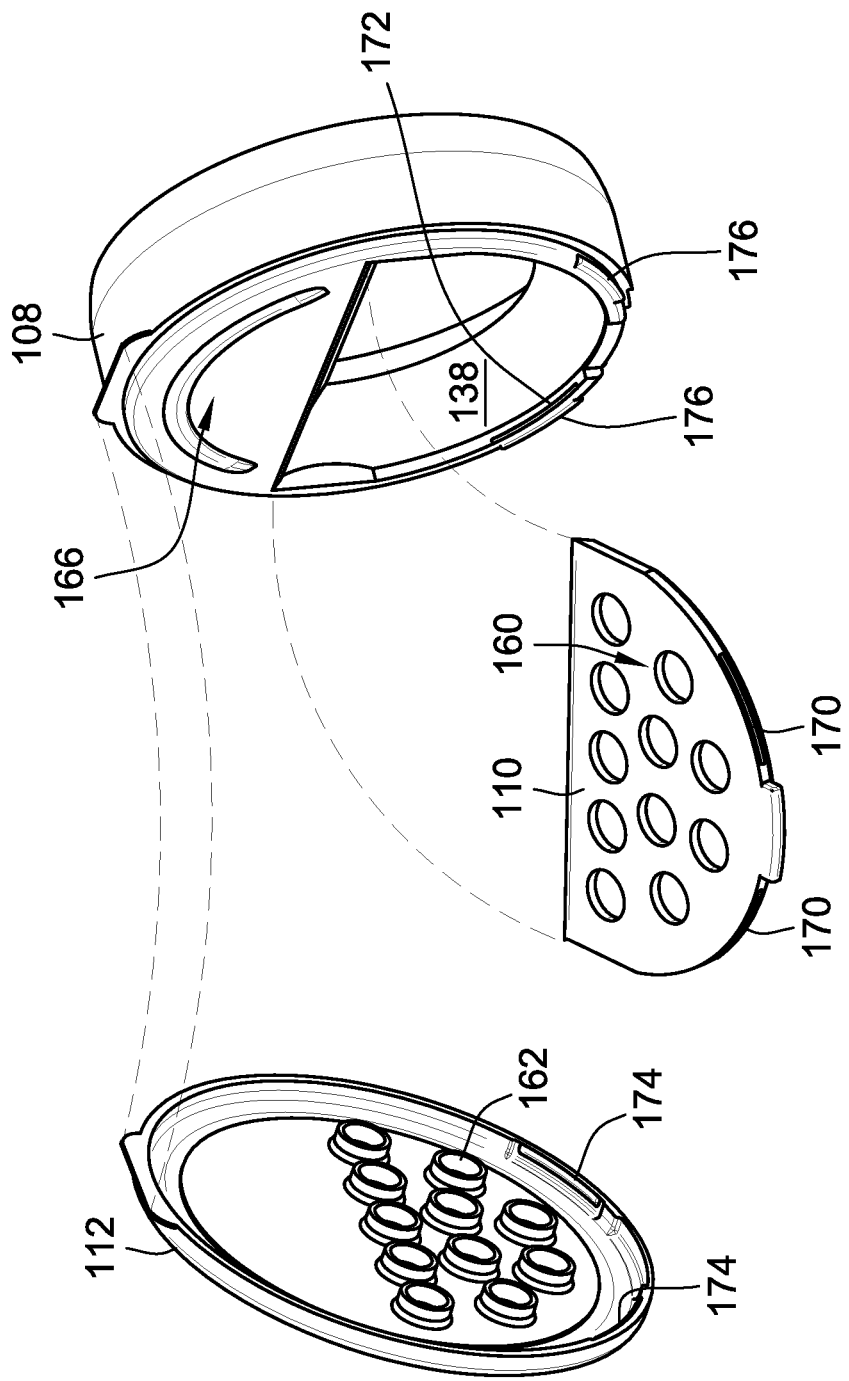
FIG. 14 is an enlarged exploded and reoriented illustration of the measuring body, first cover member and second cover member of the container of FIG. 1.

With reference to FIG. 14, catch arrangements are provided to releasably secure the first cover member 110 in its first position (see e.g. FIG. 3) and to secure the second cover member 112 in its first position (see e.g. FIG. 1). FIG. 14 is an exploded and repositioned illustration of the measuring body 108, first cover member 110 and second cover 112 but exploded and oriented to illustrate the components of the catch arrangements.

A first catch arrangement secures the first cover member 110 in the first position. The first catch arrangement is provided by a plurality of outward extending projections 170 provided on the first cover member 110 and a corresponding pair (only one shown in FIG. 14) of radially inward extending projections 172 provided on the measuring body 108.

A second catch arrangement secures the second cover member 112 in the first position. The second catch arrangement is provided by a plurality of inward extending projections 174 (only one shown in FIG. 14) provided on the second cover member 112 and a corresponding pair of radially outward extending projections 176 provided on the measuring body 108.

It should be noted that when the second cover member 112 is secured in the first position, the first cover member 110 will also be in its first position. The second cover member 112 will inhibit pivoting of the first cover member 110 towards its second position. In an embodiment, where the second cover member 112 engages the first cover member 110, e.g. via apertures 160 and projections 162, the first and second cover members 110, 112 would be prevented from pivoting from the first position to the second position relative to the measuring body 108.

Further, it is noted that the entire container closure 104 can be provided by simply two components. The first component would be the closure base 106 and the second component would be a component formed from the measuring body 108, first cover member 110 and second cover member 112 formed as a single continuous piece. This simplifies the number of parts that need to be manufactured as well as potential tolerance stack-up. Further, it also makes it easier to assemble the containers 100.

While illustrated in the form of a measured volume container closure, the use of the dual overlapping cover members could be implemented in container closures that do not allow for measuring a predetermined amount of product to be dispensed. However, the overlapping cover members could be used to simply allow for sifting or bulk dispensing of product from a container. The use of the overlapping cover members allows for both operations on a smaller footprint of the container closure as compared to prior designs where the bulk dispense (e.g. large opening) is positioned adjacent to a second set of sifting apertures, rather than aligning the bulk dispense and sifting apertures depending on the desired operation as in the current design.

In such an embodiment, either the closure base or measured body component would be eliminated. The remaining one of the two could simply referred to as a base component. Such an embodiment could be substantially identical, if not identical, to the measuring body 108 in combination with the first and second cover members 110, 112 attached thereto without the inclusion of the closure base 106. In this situation, the measuring body 108 would be operably attached to the container bottom 102. This could be done by any of the methods outlined above for closure base 106 or could be integrally formed with the container bottom 102 as outlined above. However, without the closure base 106, the measuring feature would not be provided. The entire closure could be formed as one single piece component.

Further methods of dispensing are also provided for this modified closure where sifting or bulk dispensing can occur depending on the position of the first cover member.

FIGS. 15-19 are isometric illustrations of a further embodiment of a container closure 204 configured to cooperate with the open end of container bottom 102. While the illustrated container closure 204 provides for dispensing a measured volume of product, features of the embodiment need not incorporate a measured volume configuration.

The container closure 204 includes a base component 206, that in this embodiment, is in the form of a closure base that provides for dispensing a measured volume as discussed above. The base component 206 includes an aperture 216 through which product can be dispensed. However, other base components that do not provide for a measured volume, but simply provide a large aperture for dispensing product can be provided.

The container closure 204 includes first and second cover members 210, 212 that function in substantially the same way as cover members 110, 112 described above. The primary differences will be described below. The similarities will not be described in great detail and all discussions above can be used, where appropriate in describing the instant embodiment.

The first cover member 210 includes a plurality of apertures 260 therethrough. The apertures 260 are formed in a body portion 261 of the first cover member 210.

A first hinge 256 hingedly attaches the first cover member 210 for pivoting motion relative to the base component 206. The first cover member 210 is pivotable through the first hinge 256 between a first position (see e.g. FIGS. 20-21) wherein the first cover member 210 covers the aperture 216 in the base component 206 with the plurality of the apertures 260 in fluid communication with the aperture 216 in the base component 206 and a second position (see e.g. FIG. 15) wherein the first cover member 210 is pivoted away from the aperture 216 in the base component 206.

The second cover member 212 is imperforate and includes a plurality of axial projections in the form of plugs 262 extending from an inner side 263 of the second cover member 212.

Figure 22:
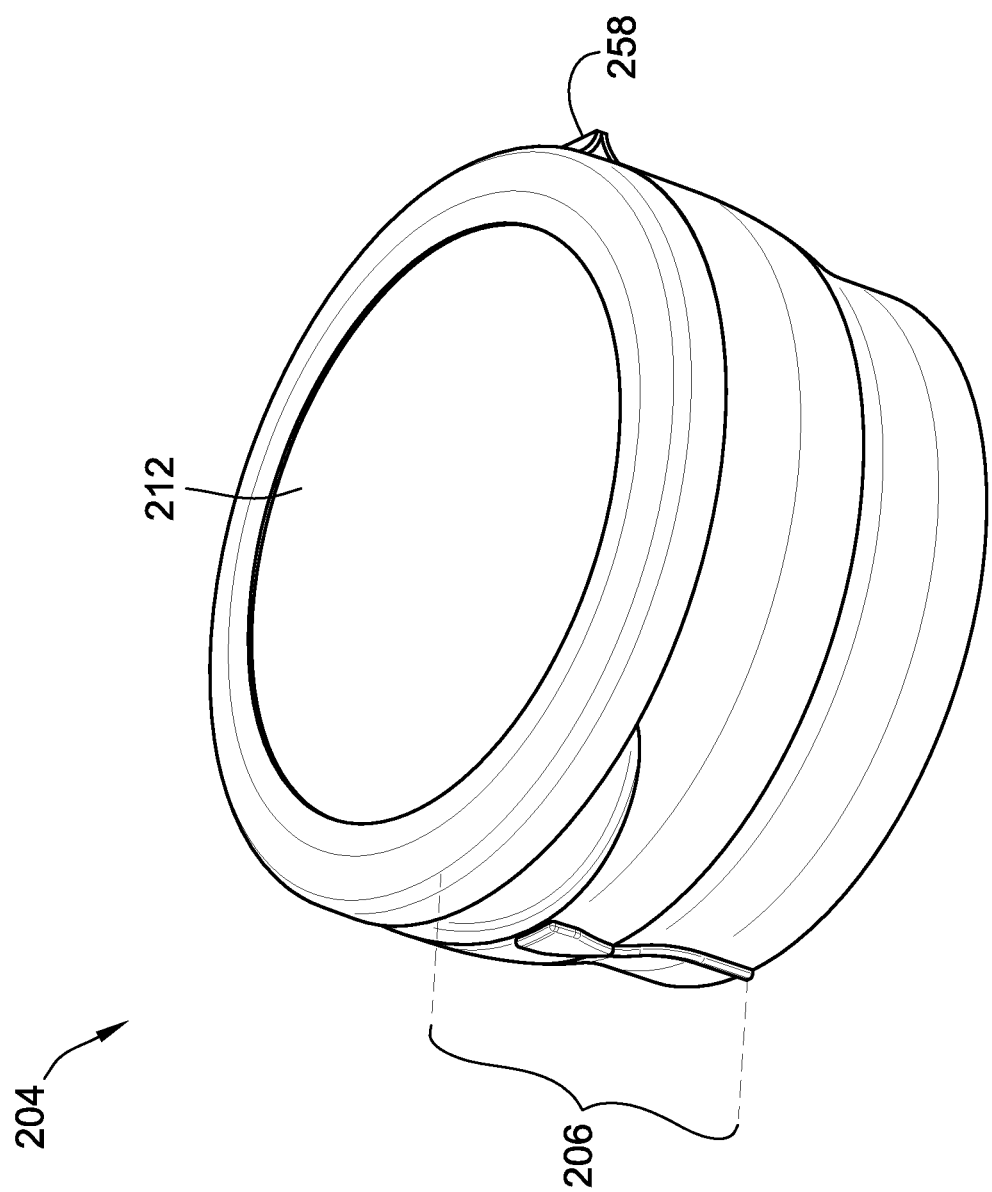
FIG. 22 is the container closure of FIG. 15 in a closed state.
Figure 23:
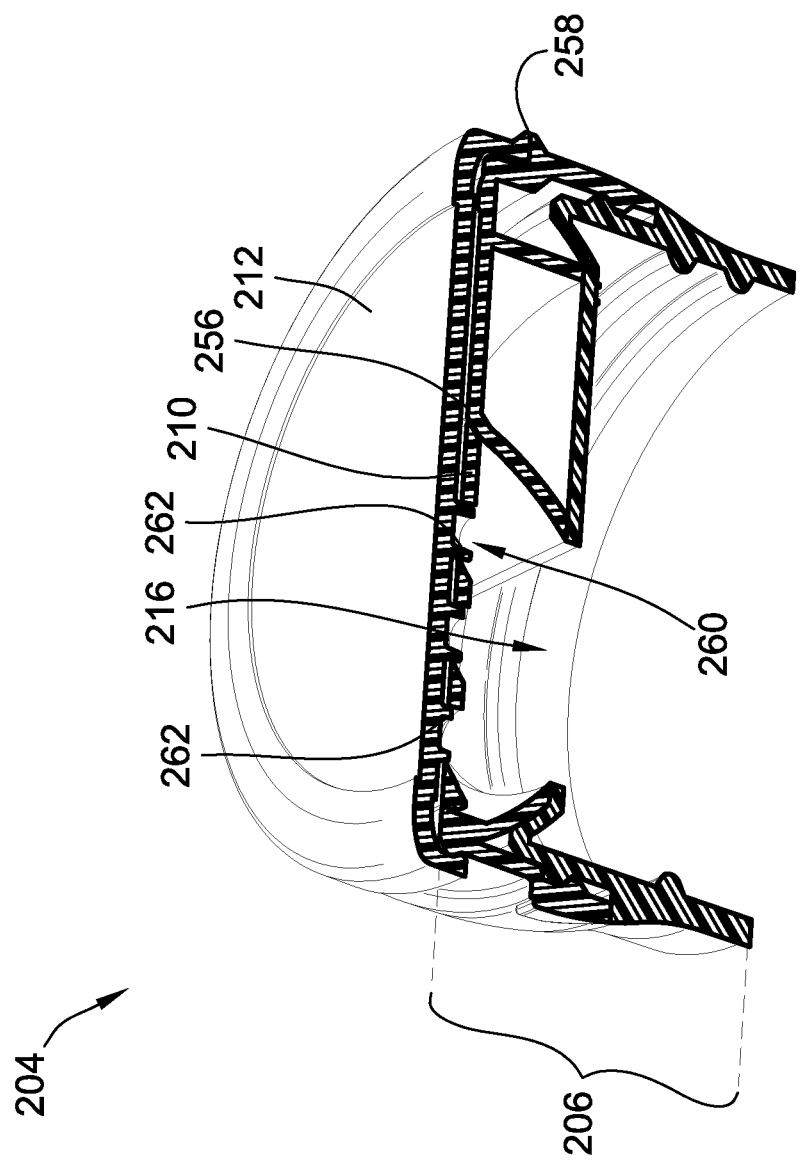
FIG. 23 is the container closure of FIG. 15 in a closed state illustrated in cross-section.

A second hinge 258 hingedly attaches the second cover member 212 for pivoting motion relative to the base component 206. The second cover member is pivotable through the second hinge 258 between a third position (see e.g. FIGS. 22-23) and a fourth position (see FIG. 15). In the third position, the second cover member 212 covers the first cover member 210 and the aperture 216 in the base component 206. Further, in the third position, the plugs 262 operably cover, align with, and, preferably, extend into and plug the plurality of apertures 260 of the first cover member 210 to close the apertures 260 and prevent spillage of material. In the fourth position, the second cover member 212 is pivoted away from the first cover member 210.

It is a feature of this embodiment, that both the first cover member 210 and the second cover member 212 can be pivoted from the second and fourth positions to the first and third positions, respectively, by simply pivoting the second cover member 212 from the fourth position to the third position. As such, force from a user to close the second cover member 212, e.g. transition from the fourth position to the third position, will also apply a force to transition the first cover member 210 from the second position to the first position.

In this embodiment, the first cover member 210 includes contact regions 280 that are spaced away from the first hinge 256. The second cover member 212 includes slide regions 282 on the inner side 263 of the second cover member 212. The contact regions 280 and slide regions 282 cooperate to form a slide arrangement provided between the first and second cover members 210, 212. The slide arrangement (e.g. contact regions 280 and slide regions 282) prevent the first cover member 210, and particularly free edge 265 (see FIG. 15), from getting caught up on the plugs 262 and inhibiting pivotal movement of the first and second cover members 210, 212 about corresponding first and second hinges 256, 258.

In operation, the contact regions 280 of the first cover member 210 slidingly engage the sliding regions 282 of the second cover member 212 when the second cover member 212 transitions the first cover member 210 from the second position toward the first position as the second cover member 212 transitions from the fourth position toward the third position. More particularly, the contact regions 280 and sliding regions 282 engage when the user closes both the first and second cover members 210, 212 by only applying force only to the second cover member 212. Thus, the closing of the second cover member 212 causes the second cover member 212 to contact and run into the first cover member 210, which also causes the first cover member 210 to close.

In the illustrated embodiment, the contact regions 280 are formed by a pair of projections 284 that extend outward from the body portion 261 away from the first hinge 256. The contact regions 280 are formed by distal ends of the projections 284 that are farthest most points of the first cover member 210 from the first hinge 256.

The sliding regions 282 are provided by ribs 286 that extend outward from the inner side 263 of the second cover member 212. The ribs 286 extend lengthwise transverse to the second hinge 258. The lengthwise extension of the ribs 286 is generally perpendicular to the first and second hinges 256, 258 to accommodate the sliding engagement between the contact regions 280 and sliding regions 282 when closing the second cover member 212. Further, the sliding regions 282, e.g. ribs 286, extend outward relative to the second hinge 258 farther than the plugs 262. This allows the contact regions 280 to remain in sliding contact with the sliding regions 282 as the contact regions 280 slide past the plugs 262 when sliding in an outward direction relative to the second hinge 258 during closing operations.

The ribs 286 include opposed ends. The opposed ends of the ribs 286 are tapered such that the ribs 286 extend farther from the inner side 263 when moving further away from the second hinge 258. The first tapered section 288 of each of the ribs 286 allows the contact regions 280 to easily slide up onto the ribs 286 during closing operations.

The second tapered section 290 of each of the ribs 286 helps bias the first cover member 210 into snap engagement with the base component 206. More particularly, tapered sections 290 will press on an outer surface of the first cover member 210 when the first cover member 210 is in the first position and the second cover member 212 is in the third position. This pressure will aid in causing a snap engagement between free end 265 of the first cover with a snap portion 292 of the base component 206. More particularly, the snap portion 292 is in the form of cantilevered rib that engages a corresponding cantilevered rib of the free end 265 of the first cover member 210. Again, the second tapered sections 290 will help bias the cooperating ribs past one another to create axial engagement that secures the first cover member 210 in the first position.

Additionally, the base component 206 includes a pair of recesses 294 formed proximate an outer periphery thereof that receive projections 284 when the first cover member 210 is in the first position (e.g. closed).

In the illustrated embodiment, the ribs 286 divide the plurality of plugs 262 into a plurality of sets of plugs. The ribs 286 are interposed between the different sets of plugs.

Figure 15:
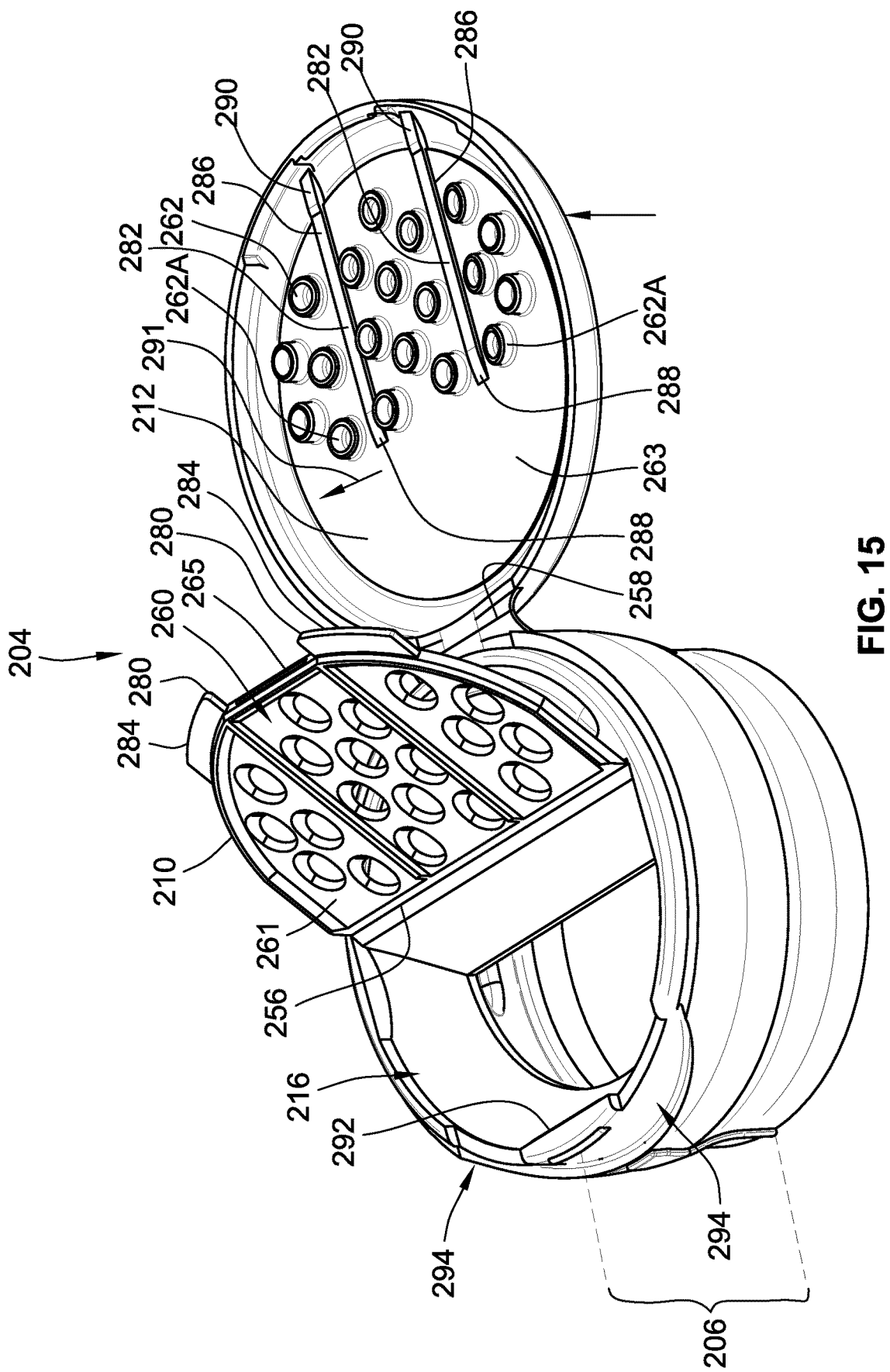
FIG. 15 is a perspective illustration of a further container closure in an open state.
Figure 16:
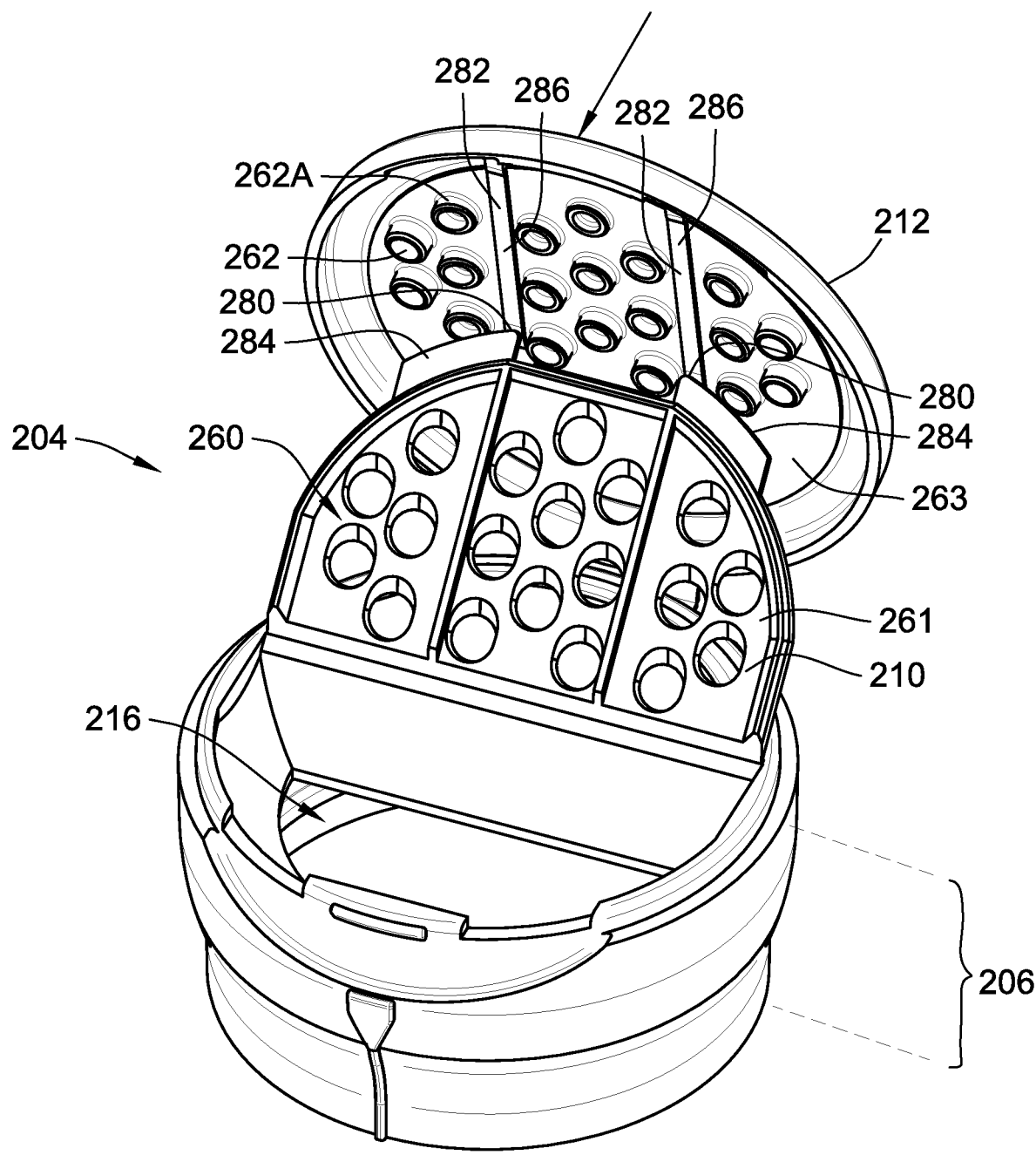
FIGS. 16-19 are perspective illustrations illustrating the container closure of FIG. 15 transition from the open state to a closed state.
Figure 17:
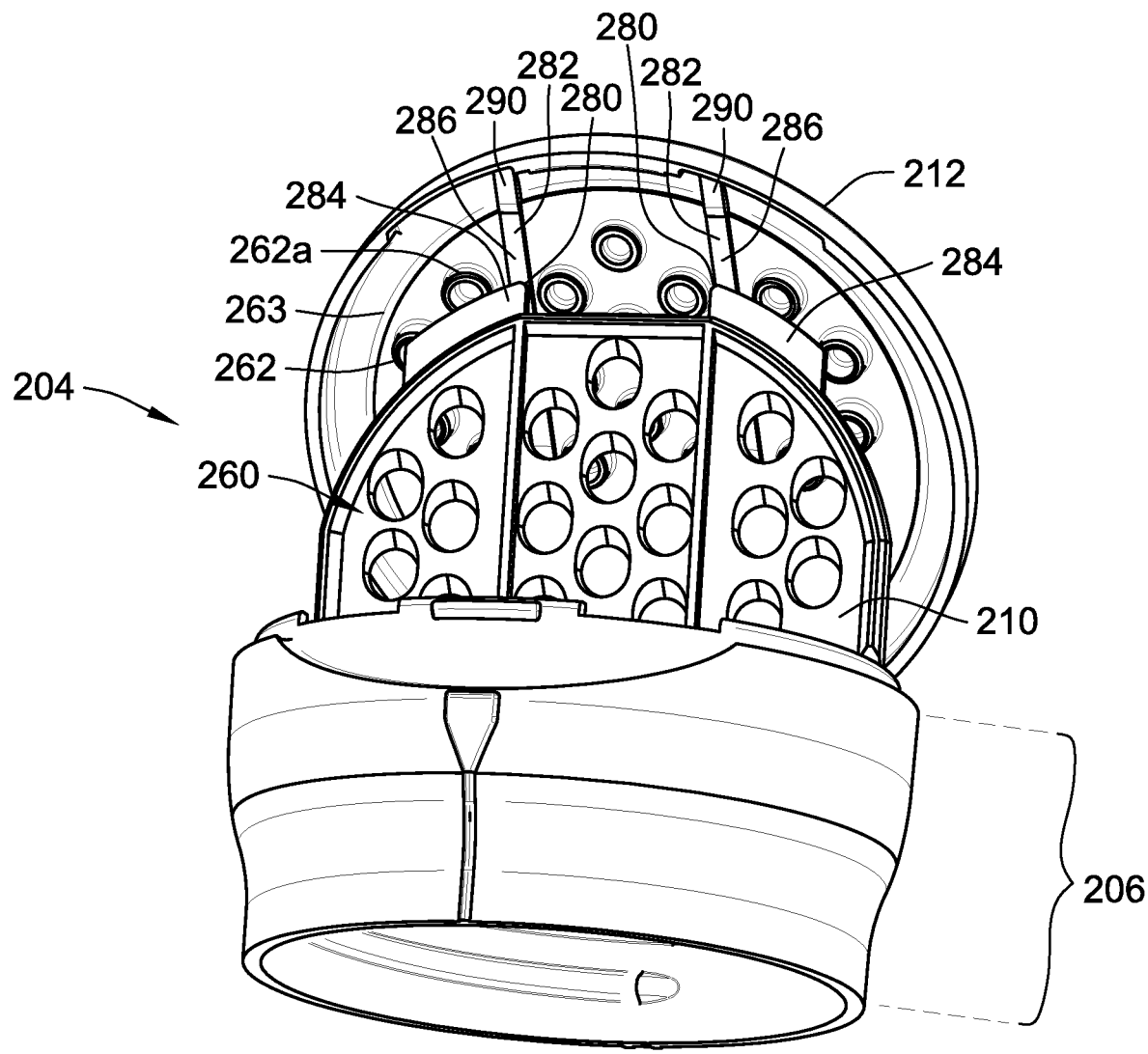
Figure 18:
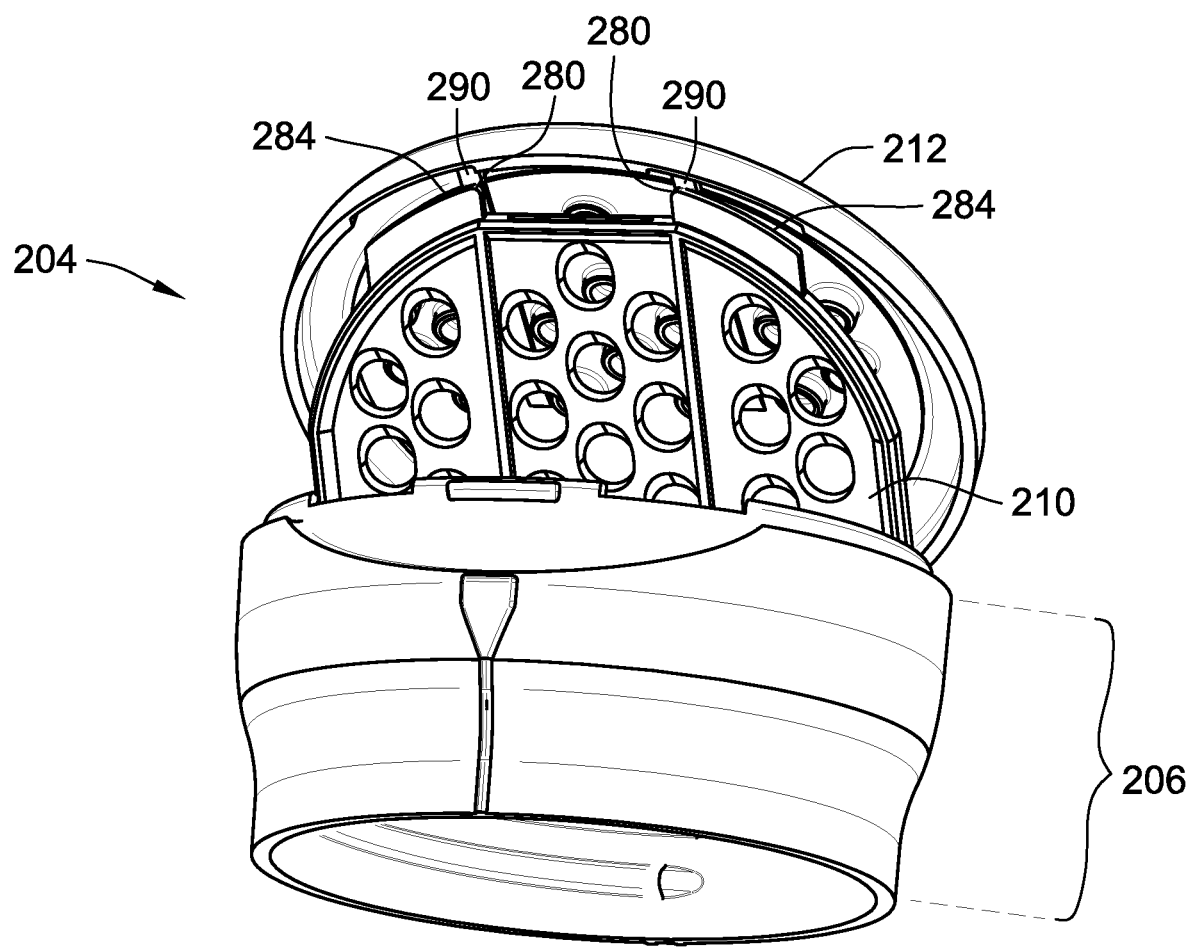
Figure 19:
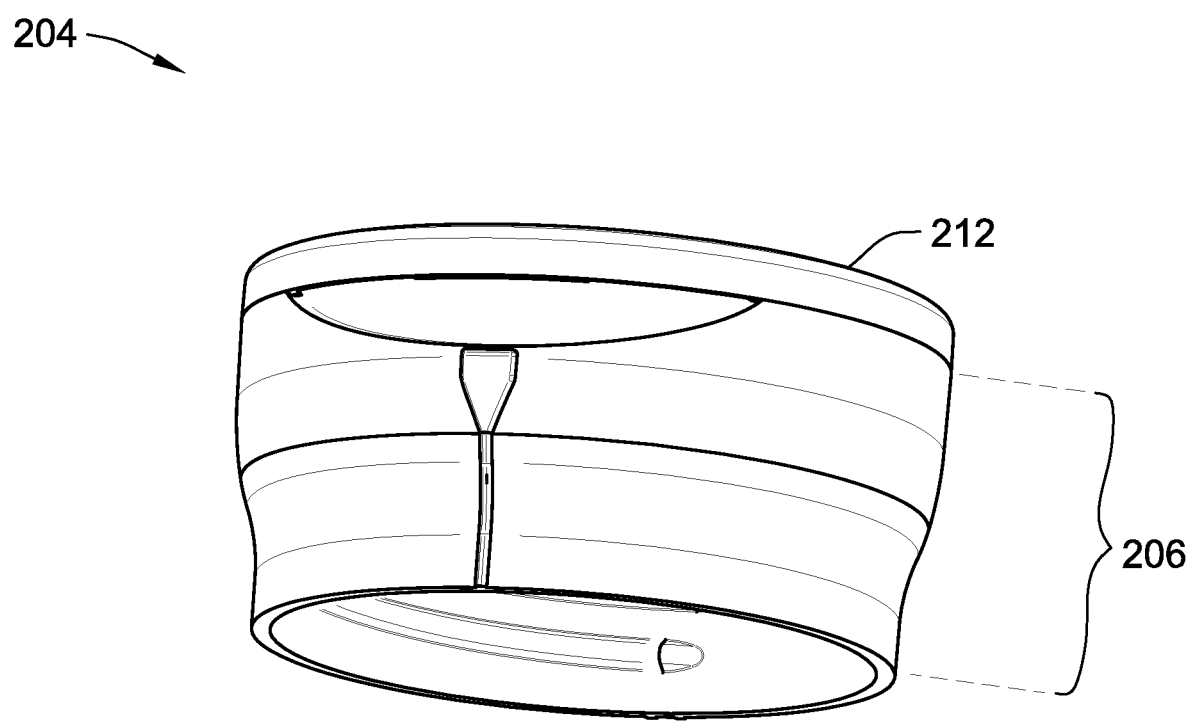

With reference to FIGS. 15 and 16, each of a plurality of the plugs 262 (identified specifically with reference character 262A) has a tapered profile. The tapered profile is such that the plugs 262A extend increasingly farther from the inner side 263 of the second cover member 212 when moving away from the sliding region 282, e.g. when moving in the direction illustrated by arrow 291 the plugs 262A get taller.

This tapered configuration to the plugs 262A allows for a clearance that allows the projections 284 to slide past the free ends of the plugs 262 during closing operations. More particularly, in this embodiment, a portion of the projections 284 extends over but does not contact the tapered plugs 262A when the second cover member 212 transitions the first cover member 210 from the second position toward the first position as the second cover member 212 transitions from the fourth position toward the third position.

Figure 20:
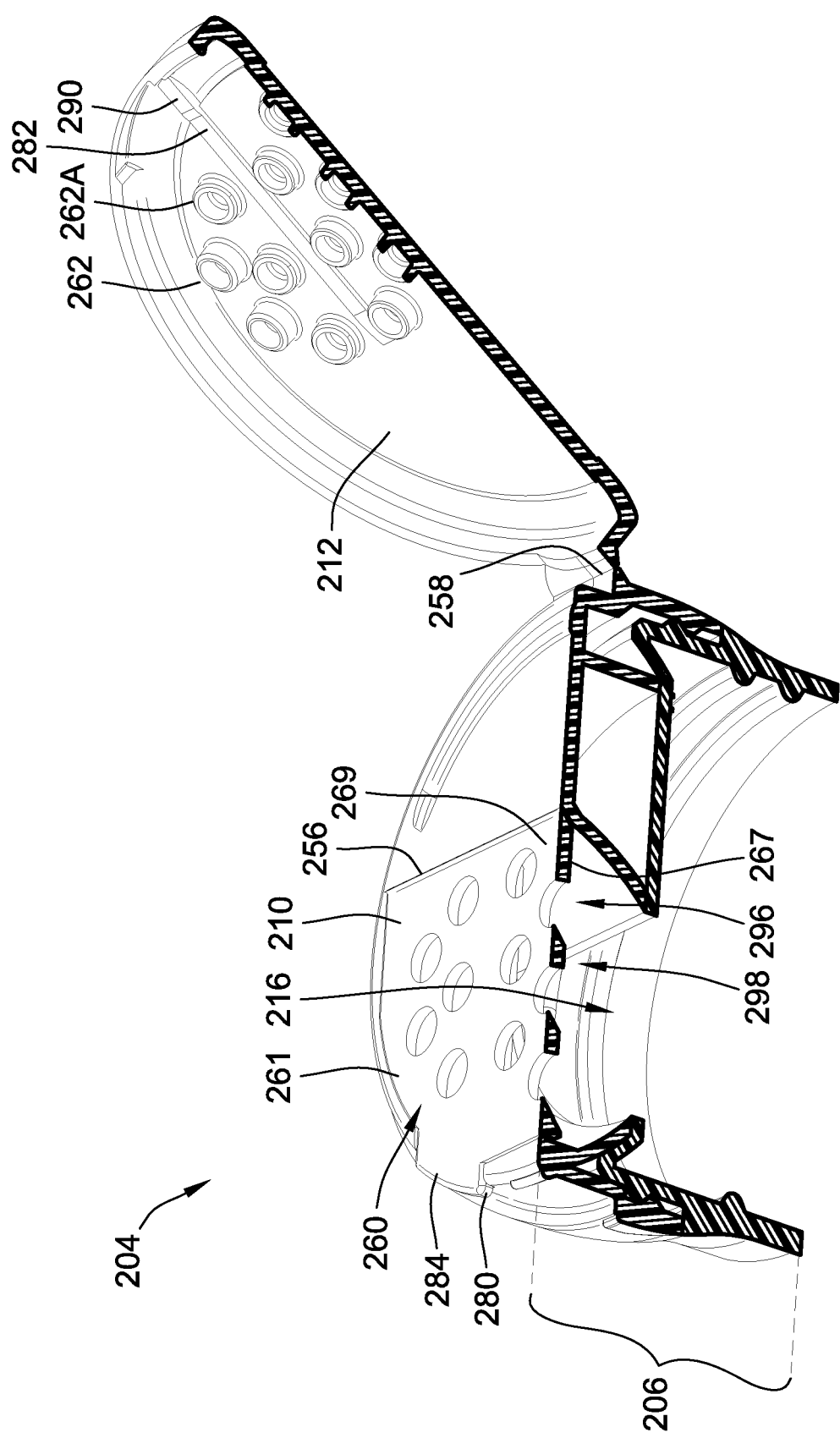
FIG. 20 is a cross-sectional illustration of the container closure of FIG. 15 with the first cover member closed and the second cover member opened.
Figure 21:
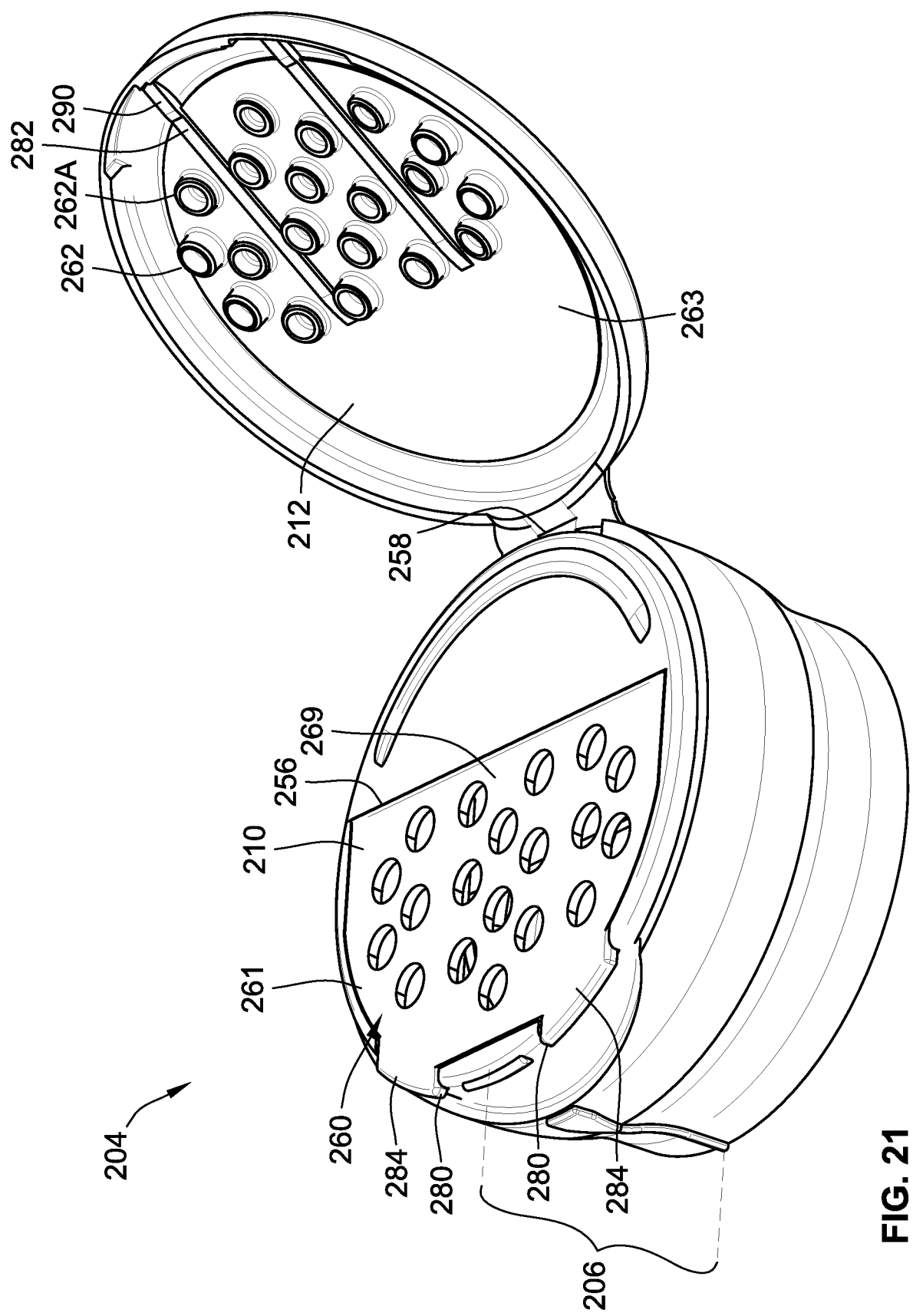
FIG. 21 is a container closure of FIG. 15 in a perspective view similar to FIG. 20.

With reference to FIG. 16 and FIG. 20, the apertures 260 that extend through the body portion 261 of the first cover member 210 have a tapered configuration. More particularly, the taper is such that the cross-section of the apertures 260 decreases when moving from an inner surface 267 towards an outer surface 269 of the body portion 261. In this embodiment, the inner and outer surfaces 267, 269 are generally planar surfaces and are generally parallel to one another. The surfaces 267, 269 are generally offset from one another and face in opposite directions. Further, the tapered configuration of the apertures 260 is such that the taper is not uniform when moving outward away from the first hinge 256. With reference to FIG. 20, a portion 296 of the sidewall defining the aperture 260 has a different angle relative to the inner and outer surfaces 267, 269 than a portion 298 of the sidewall defining the aperture 260 that is further away from the first hinge 256. This tapered configuration assists in insertion of the plugs 262 into the apertures 260 during closing configurations. This tapered configuration, and particularly, the non-uniform taper when moving away from the first hinge 256 further allows for improved manufacture, and particularly mold ability, of the container closure 204.

Figure 24:
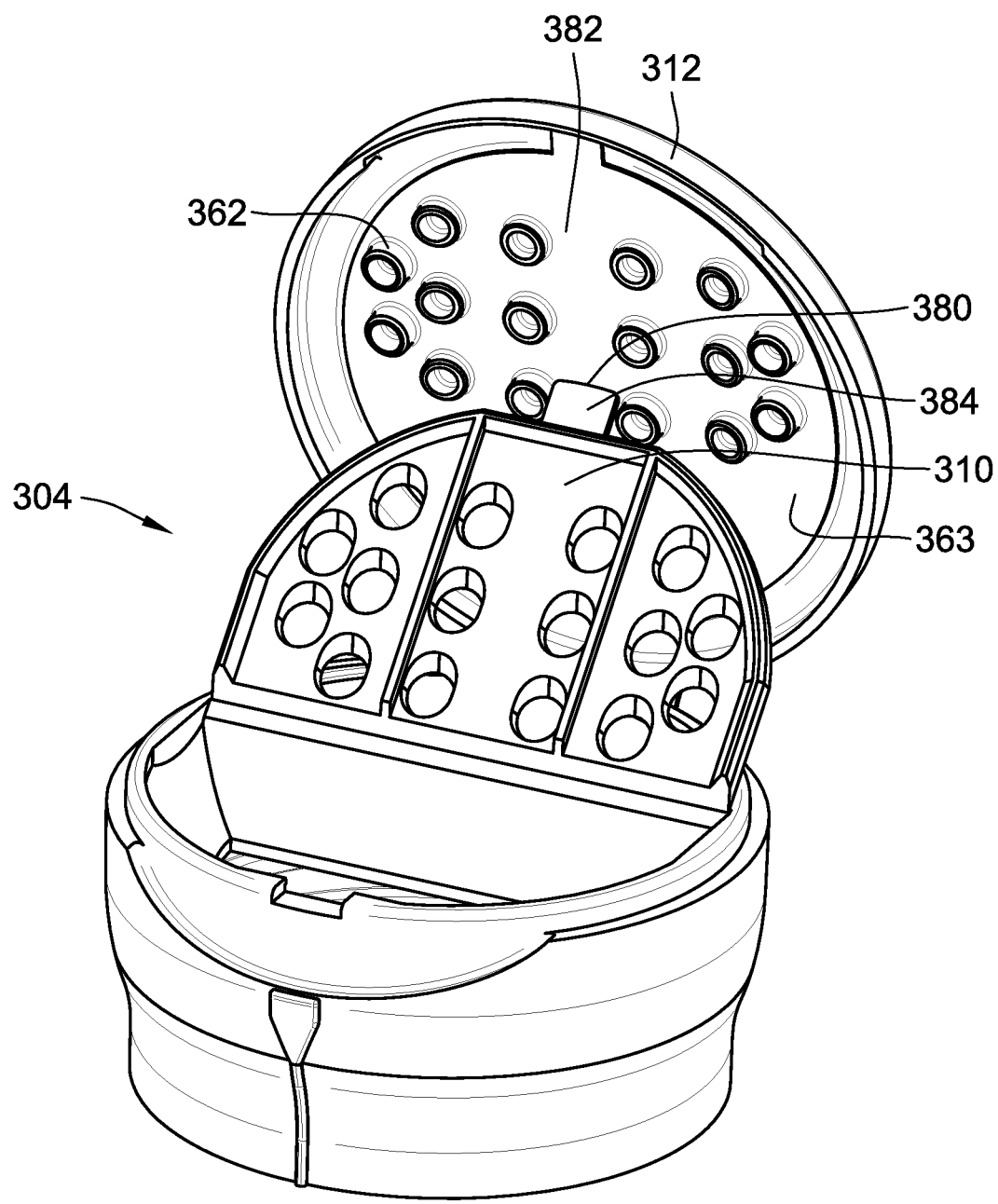
FIG. 24 is a perspective illustration of a further container closure.

FIG. 24 illustrates a further embodiment of a container closure 304. The differences of this container closure as compared to the other container closures 104, 204 will be described. This container closure 304 only includes one contact region 380 and only a single sliding region 382. The contact region 380 is provided by a single projection 384 that forms part of the first cover member 310. The sliding region 382 is provided by a portion of the inner side 363 of the second cover member 312 rather than a rib. The portion separates the plurality of plugs 362 into two separate sets of plugs. Again, the contact region 380 and sliding region 382 prevent the first cover member 310 from getting hung up on the plugs 362 during closing operations.

Again, the container closures 204, 304 are shown without a container bottom but can be separate components that are attachable to a container bottom to form a container similar to container 100 or could be permanently attached to a container bottom to form a container.

Methods of closing the container closures 204, 304 are also provided. The method will be described with reference to container closure 204 but it is equally applicable to container closure 304. The method includes pivoting the second cover member 212 from the fourth position toward the third position about the second hinge 258 by applying a force to the second cover member 212. The method includes contacting the sliding region 282 with the contact region 280 by pivoting the second cover member 212 relative to the base component 206. The method includes pivoting the first cover member 210 from the second position toward the first position about the first hinge 256 by applying a force to the first cover member 210 via sliding engagement between the sliding region 282 and the contact region 280.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A container closure comprising:
a base component having an aperture extending therethrough;
a first cover member defining a plurality of apertures therethrough;
a first hinge hingedly attaching the first cover member for pivoting motion relative to the base component, the first cover member being pivotable through the first hinge between a first position wherein the first cover member covers the aperture in the base component with the plurality of the apertures in fluid communication with the aperture in the base component and a second position wherein the first cover member is pivoted away from the aperture in the base component, the first cover member including a contact region spaced away from the first hinge;
a second cover member being imperforate and including a plurality of plugs extending from an inner side of the second cover member, the second cover member including a sliding region on the inner side of the second cover member;
a second hinge hingedly attaching the second cover member for pivoting motion relative to the base component between a third position that covers the first cover member and the aperture in the base component and a fourth position wherein the second cover member is pivoted away from the first cover member, the plugs of the second cover member aligned with and closing the plurality of apertures in the first cover member when the second cover member is in the third position;
wherein the contact region of the first cover member slidingly engages the sliding region when the second cover member transitions the first cover member from the second position toward the first position as the second cover member transitions from the fourth position toward the third position; and
wherein the plurality of plugs includes a first set of plugs and a second set of plugs, the sliding region is interposed between and separates the first set of plugs from the second set of plugs.

2. The container closure of claim 1, wherein the contact region is formed as a farthest most point of the first cover member from the first hinge.

3. The container closure of claim 1, wherein the first cover member includes a body portion through which the plurality of apertures extends and a projection extending outward from the body portion away from the first hinge, the contact region being provided by the projection.

4. The container closure of claim 1, wherein the sliding region is provided by a portion of the inner side of the second cover member.

5. The container closure of claim 1, wherein the first cover member includes a body portion defining an outer surface and an inner surface that are generally planar and parallel to one another, the inner and outer surfaces being offset from one another, the plurality of apertures extend entirely through the body portion, at least one of the plurality of apertures extends through the body portion in a tapered configuration such that the aperture gets smaller in cross-section when moving from the inner surface toward the outer surface.

6. A method of closing a container closure of claim 1, the method comprising:
pivoting the second cover member from the fourth position toward the third position about the second hinge by applying a force to the second cover member;
contacting the sliding region with the contact region by pivoting the second cover member relative to the base component; and
pivoting the first cover member from the second position toward the first position about the first hinge by applying a force to the first cover member via sliding engagement between the sliding region and the contact region.

7. A container closure comprising:
a base component having an aperture extending therethrough;
a first cover member defining a plurality of apertures therethrough;
a first hinge hingedly attaching the first cover member for pivoting motion relative to the base component, the first cover member being pivotable through the first hinge between a first position wherein the first cover member covers the aperture in the base component with the plurality of the apertures in fluid communication with the aperture in the base component and a second position wherein the first cover member is pivoted away from the aperture in the base component, the first cover member including a contact region spaced away from the first hinge;
a second cover member being imperforate and including a plurality of plugs extending from an inner side of the second cover member, the second cover member including a sliding region on the inner side of the second cover member;
a second hinge hingedly attaching the second cover member for pivoting motion relative to the base component between a third position that covers the first cover member and the aperture in the base component and a fourth position wherein the second cover member is pivoted away from the first cover member, the plugs of the second cover member aligned with and closing the plurality of apertures in the first cover member when the second cover member is in the third position;

wherein the contact region of the first cover member slidingly engages the sliding region when the second cover member transitions the first cover member from the second position toward the first position as the second cover member transitions from the fourth position toward the third position; and wherein at least one of the plurality of plugs has a tapered profile such that the at least one of the plurality of plugs extends increasingly farther from the inner side of the second cover member when moving away from the sliding region.

8. The container closure of claim 7, wherein the first cover member includes a body portion through which the plurality of apertures extends and a projection extending outward from the body portion away from the first hinge, the contact region being provided by the projection, a portion of the projection extends over but does not contact the at least one of the plurality of plugs that has the tapered profile when the second cover member transitions the first cover member from the second position toward the first position as the second cover member transitions from the fourth position toward the third position.

9. A container closure comprising:
a base component having an aperture extending therethrough;
a first cover member defining a plurality of apertures therethrough;
a first hinge hingedly attaching the first cover member for pivoting motion relative to the base component, the first cover member being pivotable through the first hinge between a first position wherein the first cover member covers the aperture in the base component with the plurality of the apertures in fluid communication with the aperture in the base component and a second position wherein the first cover member is pivoted away from the aperture in the base component, the first cover member including a contact region spaced away from the first hinge;
a second cover member being imperforate and including a plurality of plugs extending from an inner side of the second cover member, the second cover member including a sliding region on the inner side of the second cover member;
a second hinge hingedly attaching the second cover member for pivoting motion relative to the base component between a third position that covers the first cover member and the aperture in the base component and a fourth position wherein the second cover member is pivoted away from the first cover member, the plugs of the second cover member aligned with and closing the plurality of apertures in the first cover member when the second cover member is in the third position;
wherein the contact region of the first cover member slidingly engages the sliding region when the second cover member transitions the first cover member from the second position toward the first position as the second cover member transitions from the fourth position toward the third position; and
wherein the sliding region is provided by a rib extending outward from the inner side of the second cover member, the rib extending lengthwise transverse to the second hinge.

10. The container closure of claim 9, wherein the first cover member includes a body portion through which the plurality of apertures extends and a projection extending outward from the body portion away from the first hinge, the contact region being provided by the projection.

11. The container closure of claim 9, wherein the base component includes a recess, the projection extending into the recess when the second cover member is in the third position.

12. The container closure of claim 9, wherein at least one end of the rib includes a tapered section.

13. The container closure of claim 12, wherein the first cover member snap engages with the base component to prevent pivoting from the first position toward the second position, the tapered section contacting the first cover member when the first cover member is in the first position and the second cover member is in the third position to bias the first cover member into snap engagement with the base component.

14. The container closure of claim 12, wherein a second end of the rib, opposite the at least one end of the rib, includes a tapered section.

15. The container closure of claim 9, wherein the sliding region extends lengthwise away from the second hinge a distance farther than the position of at least one of the plurality of plugs relative to the second hinge, the contact region sliding along the sliding region past the at least one of the plurality of plugs when the second cover member transitions the first cover member from the second position to the first position as the second cover member transitions from the fourth position to the third position.

16. A container closure comprising:
a base component having an aperture extending therethrough;
a first cover member defining a plurality of apertures therethrough;
a first hinge hingedly attaching the first cover member for pivoting motion relative to the base component, the first cover member being pivotable through the first hinge between a first position wherein the first cover member covers the aperture in the base component with the plurality of the apertures in fluid communication with the aperture in the base component and a second position wherein the first cover member is pivoted away from the aperture in the base component, the first cover member including a contact region spaced away from the first hinge;
a second cover member being imperforate and including a plurality of plugs extending from an inner side of the second cover member, the second cover member including a sliding region on the inner side of the second cover member;
a second hinge hingedly attaching the second cover member for pivoting motion relative to the base component between a third position that covers the first cover member and the aperture in the base component and a fourth position wherein the second cover member is pivoted away from the first cover member, the plugs of the second cover member aligned with and closing the plurality of apertures in the first cover member when the second cover member is in the third position;
wherein the contact region of the first cover member slidingly engages the sliding region when the second cover member transitions the first cover member from the second position toward the first position as the second cover member transitions from the fourth position toward the third position; and
wherein the first cover member includes a second contact region and the second cover member includes a second sliding region, the second contact region of the first cover member slidingly engages the second sliding region when the second cover member transitions the first cover member from the second position to the first position as the second cover member transitions from the fourth position to the third position.

17. A container closure comprising:

a base component having an aperture extending therethrough;

a first cover member including a body portion defining an outer surface and an inner surface that are generally planar and parallel to one another, the inner and outer surfaces being offset from one another, a plurality of apertures extend entirely through the body portion, the plurality of apertures extend through the body portion in a tapered configuration such that the aperture gets smaller in cross-section when moving from the inner surface toward the outer surface;

a first hinge hingedly attaching the first cover member for pivoting motion relative to the base component, the first cover member being pivotable through the first hinge between a first position wherein the first cover member covers the aperture in the base component with the plurality of the apertures in fluid communication with the aperture in the base component and a second position wherein the first cover member is pivoted away from the aperture in the base component, the outer surface of the body portion facing away from the aperture in the base component when the first cover member is in the first position;

a second cover member being imperforate and including a plurality of plugs extending from an inner side of the second cover;

a second hinge hingedly attaching the second cover member for pivoting motion relative to the base component between a third position that covers the first cover member and the aperture in the base component and a fourth position wherein the second cover member is pivoted away from the first cover member, the plugs of the second cover member aligned with and closing the plurality of apertures in the first cover member when the second cover member is in the third position; and wherein the tapered configuration of the each aperture is provided by a sidewall, the taper provided by the sidewall is non-uniform such that when moving outward away from the first hinge, a portion of the sidewall closest the first hinge has a different angle relative to the inner and outer surfaces than a portion of the sidewall that is further away from the first hinge.

* * * * *